United States Patent
Jang et al.

(10) Patent No.: US 12,444,988 B2
(45) Date of Patent: Oct. 14, 2025

(54) MOBILITY DEVICE AND METHOD FOR DISTRIBUTING POWER IN WIRELESS COMMUNICATION SYSTEM

(71) Applicant: LG ELECTRONICS INC., Seoul (KR)

(72) Inventors: Jihwan Jang, Seoul (KR); Myunghee Lee, Seoul (KR); Jaeky Oh, Seoul (KR); Jaehoon Chung, Seoul (KR); Jaeyong Park, Seoul (KR); Yecheng He, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 18/686,717

(22) PCT Filed: Jul. 8, 2022

(86) PCT No.: PCT/KR2022/009976
§ 371 (c)(1),
(2) Date: Feb. 26, 2024

(87) PCT Pub. No.: WO2023/038259
PCT Pub. Date: Mar. 16, 2023

(65) Prior Publication Data
US 2025/0253713 A1  Aug. 7, 2025

(30) Foreign Application Priority Data

Sep. 7, 2021  (KR) .................. 10-2021-0119329

(51) Int. Cl.
*H02J 50/50* (2016.01)
*H02J 50/10* (2016.01)
(Continued)

(52) U.S. Cl.
CPC .............. *H02J 50/50* (2016.02); *H02J 50/10* (2016.02); *H02J 50/20* (2016.02); *H02J 50/80* (2016.02)

(58) Field of Classification Search
CPC .............. H02J 50/00; H02J 50/50; H04B 5/00
See application file for complete search history.

(56) References Cited

U.S. PATENT DOCUMENTS

| 2014/0021798 A1* | 1/2014 | Kesler ..................... H02J 50/80 |
| | | 307/104 |
| 2018/0138729 A1 | 5/2018 | Yamazaki et al. |

(Continued)

FOREIGN PATENT DOCUMENTS

| KR | 10-2015-0077647 | 7/2015 |
| KR | 10-2016-0043902 | 4/2016 |

(Continued)

OTHER PUBLICATIONS

PCT International Application No. PCT/KR2022/009976, Written Opinion and International Search Report dated Oct. 17, 2022, 9 pages.

*Primary Examiner* — Adi Amrany
(74) *Attorney, Agent, or Firm* — LEE, HONG, DEGERMAN, KANG & WAIMEY

(57) ABSTRACT

A method of operating a first device in a wireless communication system may comprise receiving a synchronization signal from at least one second device and at least one third device, performing a synchronization procedure with the at least one second device and the at least one third device based on the synchronization signal, receiving control information from the at least one second device and the at least one third device, checking scheduling information from the control information, and receiving power from at least one second device and transmitting power to the at least one (Continued)

third device while moving based on the scheduling information.

13 Claims, 19 Drawing Sheets

(51) Int. Cl.
*H02J 50/20* (2016.01)
*H02J 50/80* (2016.01)

(56) References Cited

U.S. PATENT DOCUMENTS

2018/0290561 A1* 10/2018 Baumgärtner ........ B60L 53/126
2019/0348871 A1* 11/2019 Sakata .................... H02J 50/80

FOREIGN PATENT DOCUMENTS

KR  10-2018-0015249   2/2018
KR  10-2019-0104477   9/2019

* cited by examiner

MOBILITY DEVICE AND METHOD FOR DISTRIBUTING POWER IN WIRELESS COMMUNICATION SYSTEM

CROSS-REFERENCE TO RELATED APPLICATION(S)

This application is the National Stage filing under 35 U.S.C. 371 of International Application No. PCT/KR2022/009976, filed on Jul. 8, 2022, which claims the benefit of earlier filing date and right of priority to Korean Application No. 10-2021-0119329, filed on Sep. 7, 2021, the contents of which are all hereby incorporated by reference herein in their entireties.

TECHNICAL FIELD

The following description relates to a wireless communication system and to a device and method for distributing power in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure relates to a device and method for effectively distributing power using wireless power transmission technology in a wireless communication system.

The present disclosure can provide a device and method for wirelessly sharing power through a mobility coordinator in a wireless communication system.

The present disclosure relates to a device and method for effectively collecting power by utilizing mobility in a wireless communication system.

The present disclosure relates to a device and method for effectively distributing power by utilizing mobility in a wireless communication system.

The present disclosure can provide a device and method for obtaining information necessary for wireless power sharing in a wireless communication system.

The present disclosure can provide a device and method for determining power sharing priorities of devices subject to wireless power sharing in a wireless communication system.

The present disclosure can provide a device and method for setting a movement path of a coordinator for wireless power sharing in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of operating a first device in a wireless communication system may comprise receiving a synchronization signal from at least one second device and at least one third device, performing a synchronization procedure with the at least one second device and the at least one third device based on the synchronization signal, receiving control information from the at least one second device and the at least one third device, checking scheduling information from the control information, and receiving power from the at least one second device and transmitting power to the at least one third device while moving based on the scheduling information.

As an example of the present disclosure, a first device in a wireless communication system may comprise a transceiver, a circuit for power reception and a processor connected to the transceiver and the circuit. The processor may receive a synchronization signal from at least one second device and at least one third device, perform a synchronization procedure with the at least one second device and the at least one third device based on the synchronization signal, receive control information from the at least one second device and the at least one third device, check scheduling information from the control information and receive power from the at least one second device and transmit power to the at least one third device while moving based on the scheduling information.

As an example of the present disclosure, a device may comprise at least one processor; and at least one computer memory connected to the at least one processor and configured to store an instruction directing operations as executed by the at least one processor. The operations may comprise receiving a synchronization signal from at least one second device and at least one third device, performing a synchronization procedure with the at least one second device and the at least one third device based on the synchronization signal, receiving control information from the at least one second device and the at least one third device, checking scheduling information from the control information, and receiving power from the at least one second device and transmitting power to the at least one third device while moving based on the scheduling information.

As an example of the present disclosure, a non-transitory computer-readable medium storing at least one instruction may comprise the at least one instruction executable by a processor. The at least one instruction may control a device to receive a synchronization signal from at least one second device and at least one third device, perform a synchronization procedure with the at least one second device and the at least one third device based on the synchronization signal, receive control information from the at least one second device and the at least one third device, check scheduling information from the control information and receive power from the at least one second device and transmit power to the at least one third device while moving based on the scheduling information.

As is apparent from the above description, the embodiments of the present disclosure have the following effects.

According to the present disclosure, power use efficiency of various devices in a network can be increased.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
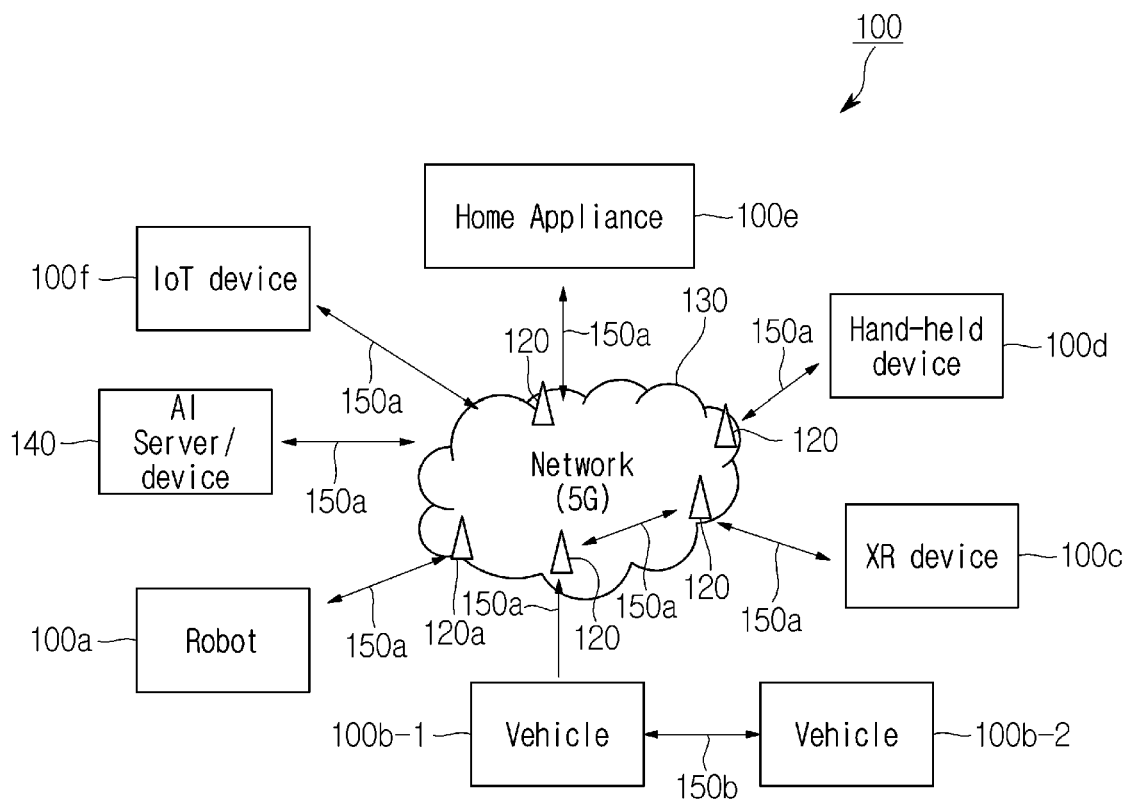
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor)

may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5GNR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
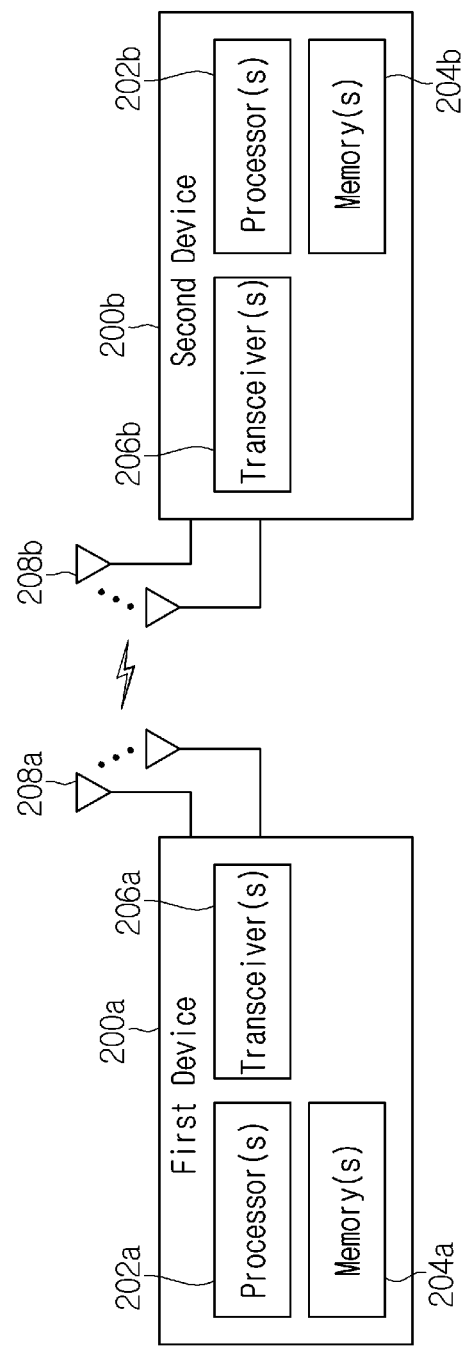
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be coupled with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be coupled with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be coupled with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be coupled with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

Figure 3:
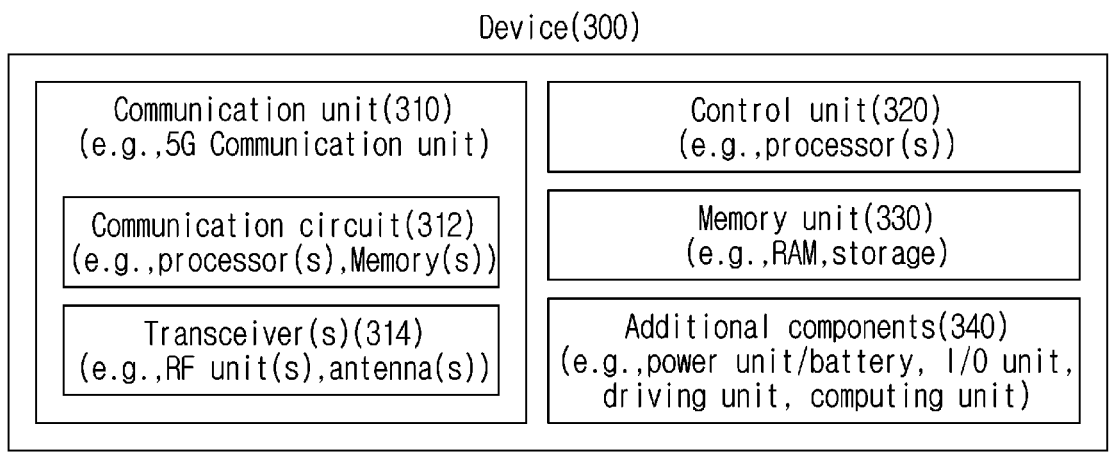
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIG. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
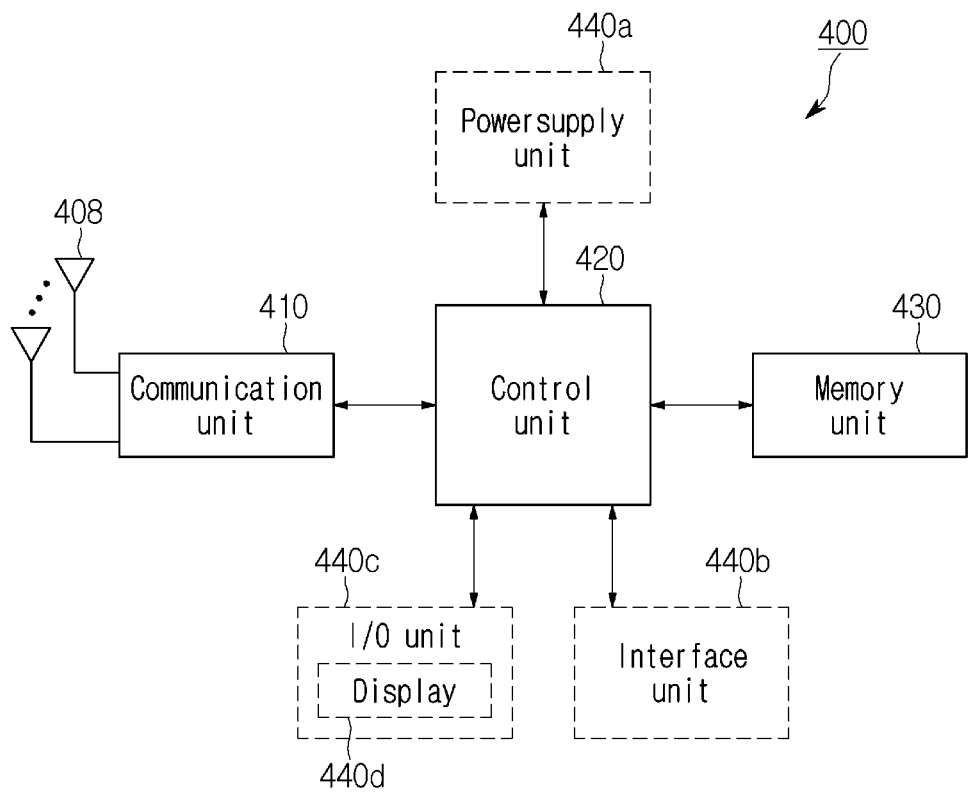
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
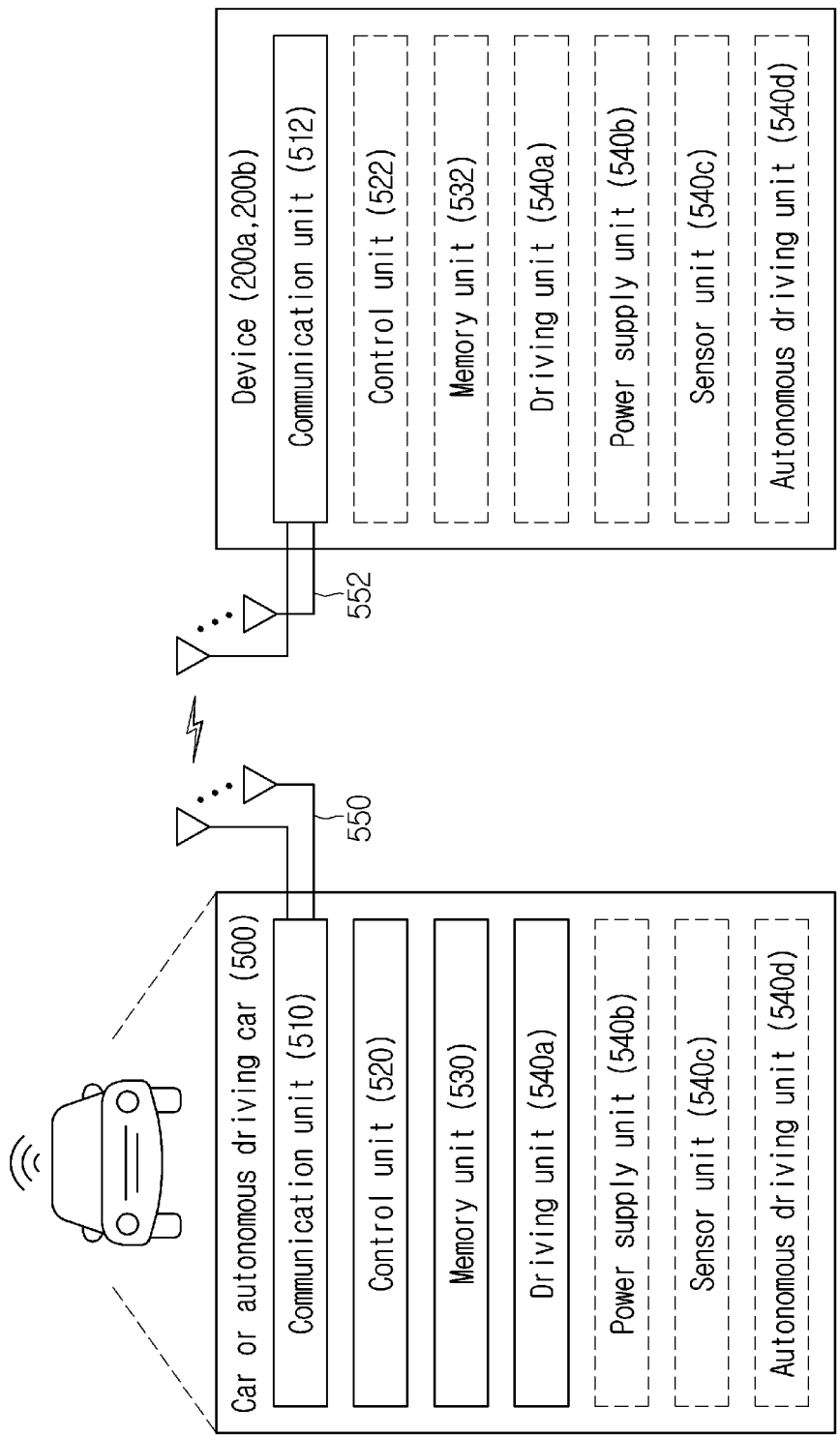
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
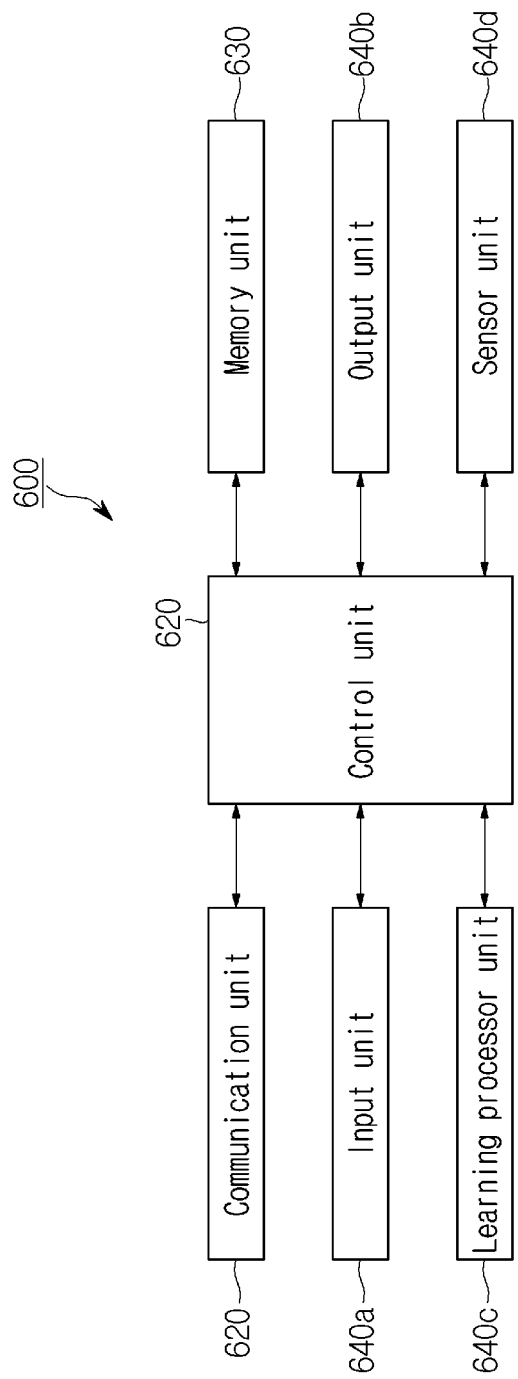
FIG. 6 is a diagram illustrating an example of an AI device applied to the present disclosure.

FIG. 6 is a diagram illustrating an example of an AI device applied to the present disclosure. For example, the AI device may be implemented as a fixed device or a movable device such as TV, projector, smartphone, PC, laptop, digital broadcasting terminal, tablet PC, wearable device, set-top box (STB), radio, washing machine, refrigerator, digital signage, robot, vehicle, etc.

Referring to FIG. 6, the AI device 600 may include a communication unit 610, a control unit 620, a memory unit 630, an input/output unit 640*a*/640*b*, a learning processor unit 640*c* and a sensor unit 640*d*. Blocks 610 to 630/640A to 640D may correspond to blocks 310 to 330/340 of FIG. 3, respectively.

The communication unit 610 may transmit and receive a wired and wireless signal (e.g., sensor information, user input, learning model, control signal, etc.) to and from external devices such as another AI device (e.g., 100*x*, 120, 140 in FIG. 1) or an AI server (140 in FIG. 1) using wired/wireless communication technology. To this end, the communication unit 610 may transmit information in the memory unit 630 to an external device or send a signal received from an external device to the memory unit 630.

The control unit 620 may determine at least one executable operation of the AI device 600 based on information determined or generated using a data analysis algorithm or machine learning algorithm. In addition, the control unit 620 may control the components of the AI device 600 to perform the determined operation. For example, the control unit 620 may request, search, receive, or utilize the data of the learning processor 640*c* or the memory unit 630, and control the components of the AI device 600 to perform predicted operation or operation determined to be preferred among at least one executable operation. In addition, the control unit 620 collects history information including a user's feedback on the operation content or operation of the AI device 600, and stores it in the memory unit 630 or the learning processor 640*c* or transmit it to an external device such as the AI server (140 in FIG. 1). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensor unit 640. Also, the memory unit 630 may store control information and/or software code required for operation/execution of the control unit 620.

The input unit 640*a* may obtain various types of data from the outside of the AI device 600. For example, the input unit 620 may obtain learning data for model learning, input data to which the learning model is applied, etc. The input unit 640a may include a camera, a microphone and/or a user input unit, etc. The output unit 640b may generate audio, video or tactile output. The output unit 640b may include a display unit, a speaker and/or a haptic module. The sensor unit 640 may obtain at least one of internal information of the AI device 600, surrounding environment information of the AI device 600 or user information using various sensors. The sensor unit 640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 640c may train a model composed of an artificial neural network using learning data. The learning processor unit 640c may perform AI processing together with the learning processor unit of the AI server (140 in FIG. 1). The learning processor unit 640c may process information received from an external device through the communication unit 610 and/or information stored in the memory unit 630. In addition, the output value of the learning processor unit 640c may be transmitted to an external device through the communication unit 610 and/or stored in the memory unit 630.

Figure 7:
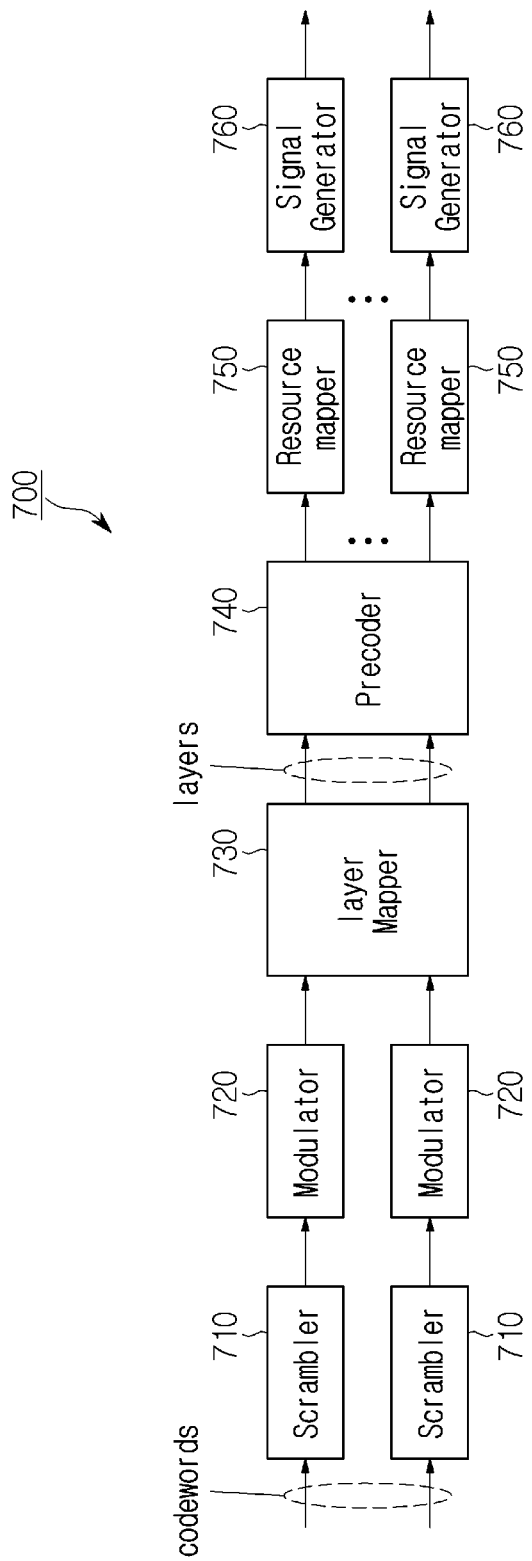
FIG. 7 is a diagram illustrating a method of processing a transmitted signal applied to the present disclosure.
Figure 8:
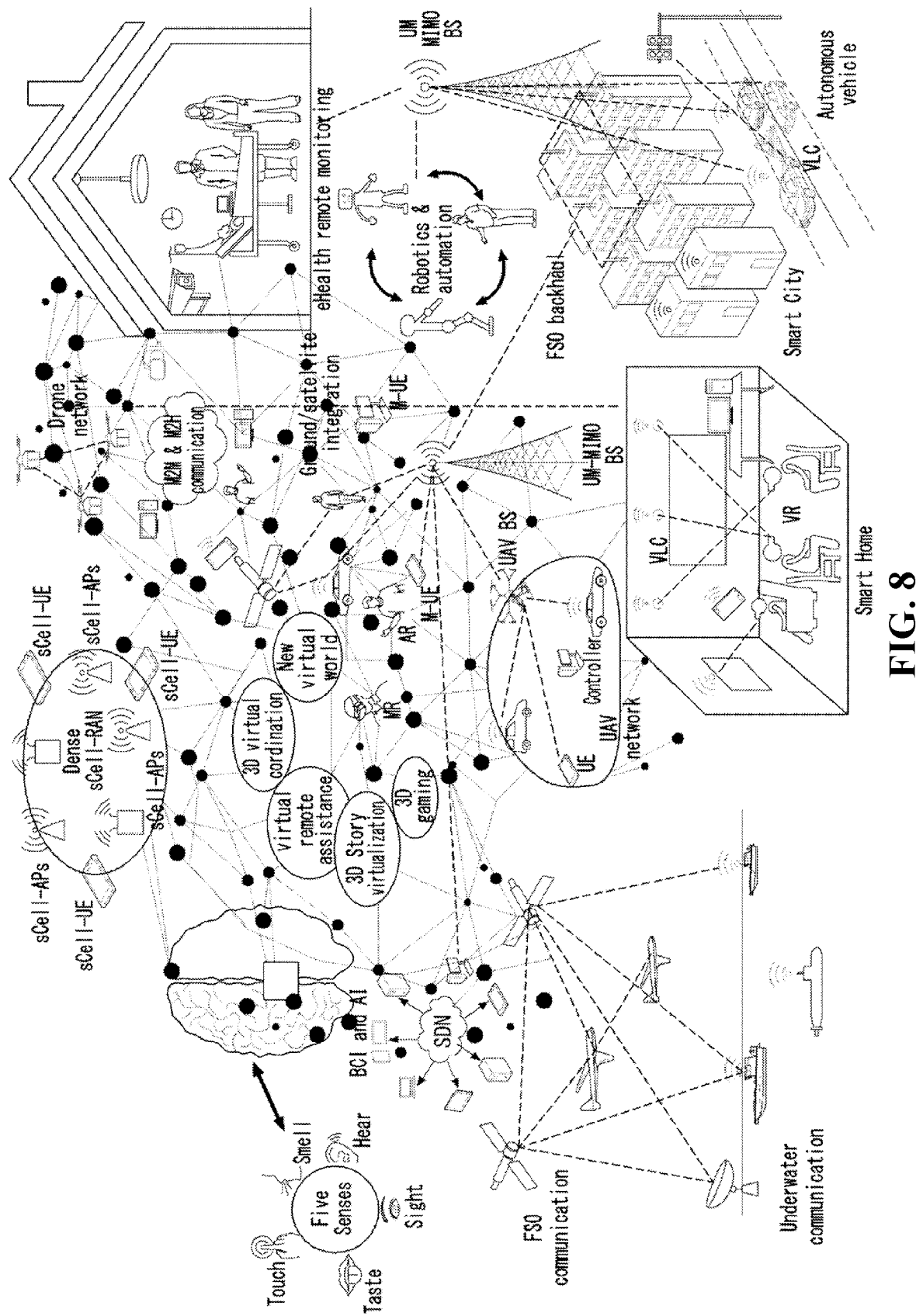
FIG. 8 is a view showing an example of a communication structure providable in a 6G system applicable to the present disclosure.

FIG. 7 is a diagram illustrating a method of processing a transmitted signal applied to the present disclosure. For example, the transmitted signal may be processed by a signal processing circuit. In this case, the signal processing circuit 700 may include a scrambler 710, a modulator 720, a layer mapper 730, a precoder 740, a resource mapper 750, and a signal generator 760. At this time, as an example, the operation/function of FIG. 7 may be performed by the processors 202a and 202b and/or the transceivers 206a and 206b of FIG. 2. Also, as an example, the hardware elements of FIG. 7 may be implemented in the processors 202a and 202b and/or the transceivers 206a and 206b of FIG. 2. As an example, blocks 710 to 760 may be implemented in the processors 202a and 202b of FIG. 2. Also, blocks 710 to 750 may be implemented in the processors 202a and 202b of FIG. 2, and block 760 may be implemented in the transceivers 206a and 206b of FIG. 2, and are not limited to the above-described embodiment.

A codeword may be converted into a radio signal through the signal processing circuit 700 of FIG. 7. Here, the codeword is an encoded bit sequence of an information block. Information blocks may include transport blocks (e.g., UL-SCH transport blocks, DL-SCH transport blocks). The radio signal may be transmitted through various physical channels (e.g., PUSCH, PDSCH). Specifically, the codeword may be converted into a scrambled bit sequence by the scrambler 710. A scramble sequence used for scrambling is generated based on an initialization value, and the initialization value may include ID information of a wireless device. The scrambled bit sequence may be modulated into a modulation symbol sequence by the modulator 720. The modulation method may include pi/2-binary phase shift keying (pi/2-BPSK), m-phase shift keying (m-PSK), m-quadrature amplitude modulation (m-QAM), and the like.

A complex modulation symbol sequence may be mapped to one or more transport layers by the layer mapper 730. Modulation symbols of each transport layer may be mapped to corresponding antenna port(s) by the precoder 740 (precoding). The output z of the precoder 740 may be obtained by multiplying the output y of the layer mapper 730 by a N*M precoding matrix W. Here, N is the number of antenna ports and M is the number of transport layers. Here, the precoder 740 may perform precoding after transform precoding (e.g., discrete Fourier transform (DFT)) on complex modulation symbols. Also, the precoder 740 may perform precoding without performing transform precoding.

The resource mapper 750 may map modulation symbols of each antenna port to time-frequency resources. The time-frequency resources may include a plurality of symbols (e.g., CP-OFDMA symbols and DFT-s-OFDMA symbols) in the time domain and may include a plurality of subcarriers in the frequency domain. The signal generator 760 generates a radio signal from the mapped modulation symbols, and the generated radio signal may be transmitted to other devices through each antenna. To this end, the signal generator 760 may include an inverse fast Fourier transform (IFFT) module, a cyclic prefix (CP) inserter, a digital-to-analog converter (DAC), a frequency uplink converter, and the like.

A signal processing process for a received signal in a wireless device may be configured as the reverse of the signal processing processes 710 to 760 of FIG. 7. For example, a wireless device (e.g., 200a and 200b of FIG. 2) may receive a radio signal from the outside through an antenna port/transceiver. The received radio signal may be converted into a baseband signal through a signal reconstructor. To this end, the signal reconstructor may include a frequency downlink converter, an analog-to-digital converter (ADC), a CP remover, and a fast Fourier transform (FFT) module. Thereafter, the baseband signal may be reconstructed to a codeword through a resource de-mapper process, a postcoding process, a demodulation process, and a de-scramble process. The codeword may be reconstructed to an original information block through decoding. Accordingly, a signal processing circuit (not shown) for a received signal may include a signal reconstructor, a resource de-mapper, a postcoder, a demodulator, a de-scrambler, and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 10:
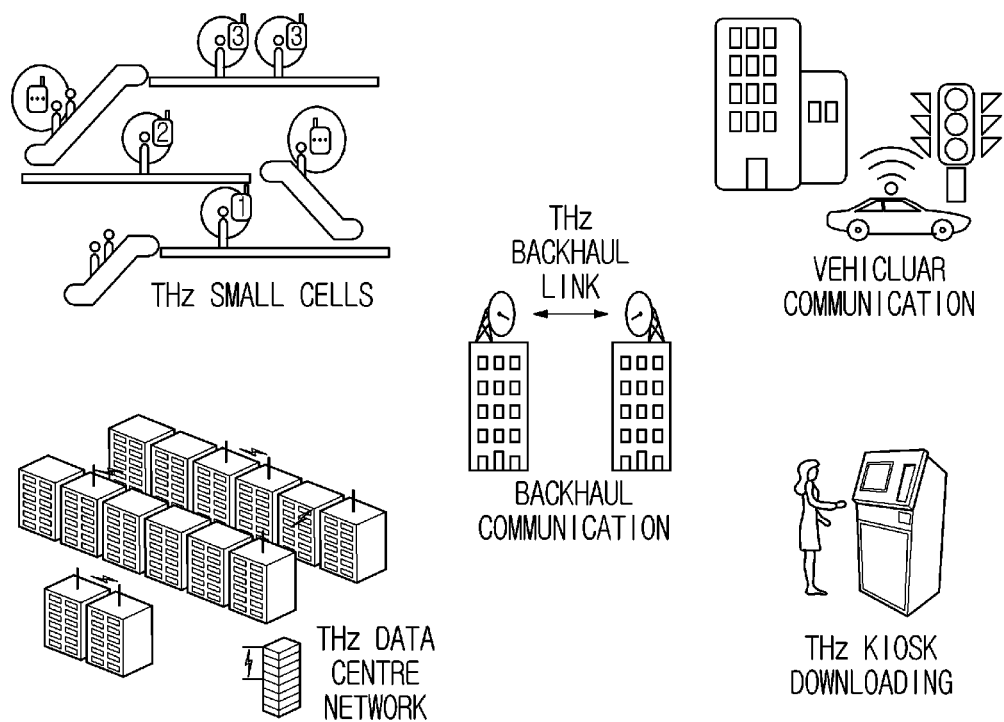
FIG. 10 is a view showing a THz communication method applicable to the present disclosure.

FIG. 10 is a view showing an example of a communication structure providable in a 6G system applicable to the present disclosure.

Referring to FIG. 10, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Core Implementation Technology of 6G System

Artificial Intelligence (AI)

The most important and newly introduced technology for the 6G system is AI. AI was not involved in the 4G system. 5G systems will support partial or very limited AI. However, the 6G system will support AI for full automation. Advances in machine learning will create more intelligent networks for real-time communication in 6G. Introducing AI in communication may simplify and enhance real-time data transmission. AI may use a number of analytics to determine how complex target tasks are performed. In other words, AI may increase efficiency and reduce processing delay.

Time consuming tasks such as handover, network selection, and resource scheduling may be performed instantly by using AI. AI may also play an important role in machine-to-machine, machine-to-human and human-to-machine communication. In addition, AI may be a rapid communication in a brain computer interface (BCI). AI-based communication systems may be supported by metamaterials, intelligent structures, intelligent networks, intelligent devices, intelligent cognitive radios, self-sustained wireless networks, and machine learning.

Recently, attempts have been made to integrate AI with wireless communication systems, but application layers, network layers, and in particular, deep learning have been focused on the field of wireless resource management and allocation. However, such research is gradually developing into the MAC layer and the physical layer, and in particular, attempts to combine deep learning with wireless transmission are appearing in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based multiple input multiple output (MIMO) mechanism, and AI-based resource scheduling and allocation may be included.

Machine learning may be used for channel estimation and channel tracking, and may be used for power allocation, interference cancellation, and the like in a downlink (DL) physical layer. Machine learning may also be used for antenna selection, power control, symbol detection, and the like in a MIMO system.

However, the application of DNN for transmission in the physical layer may have the following problems.

Deep learning-based AI algorithms require a lot of training data to optimize training parameters. However, due to limitations in obtaining data in a specific channel environment as training data, a lot of training data is used offline. This is because static training on training data in a specific channel environment may cause a contradiction between diversity and dynamic characteristics of a radio channel.

In addition, current deep learning mainly targets real signals. However, the signals of the physical layer of wireless communication are complex signals. In order to match the characteristics of a wireless communication signal, additional research on a neural network that detects a complex domain signal is required.

Hereinafter, machine learning will be described in greater detail.

Machine learning refers to a series of operations for training a machine to create a machine capable of performing a task which can be performed or is difficult to be performed by a person. Machine learning requires data and a learning model. In machine learning, data learning methods may be largely classified into three types: supervised learning, unsupervised learning, and reinforcement learning.

Neural network learning is to minimize errors in output. Neural network learning is a process of updating the weight of each node in the neural network by repeatedly inputting learning data to a neural network, calculating the output of the neural network for the learning data and the error of the target, and backpropagating the error of the neural network from the output layer of the neural network to the input layer in a direction to reduce the error.

Supervised learning uses learning data labeled with correct answers in the learning data, and unsupervised learning may not have correct answers labeled with the learning data. That is, for example, learning data in the case of supervised learning related to data classification may be data in which each learning data is labeled with a category. Labeled learning data is input to the neural network, and an error may be calculated by comparing the output (category) of the neural network and the label of the learning data. The calculated error is backpropagated in a reverse direction (i.e., from the output layer to the input layer) in the neural network, and the connection weight of each node of each layer of the neural network may be updated according to backpropagation. The amount of change in the connection weight of each updated node may be determined according to a learning rate. The neural network's computation of input data and backpropagation of errors may constitute a learning cycle (epoch). The learning rate may be applied differently according to the number of iterations of the learning cycle of the neural network. For example, in the early stages of neural network learning, a high learning rate is used to allow the neural network to quickly achieve a certain level of performance to increase efficiency, and in the late stage of learning, a low learning rate may be used to increase accuracy.

A learning method may vary according to characteristics of data. For example, when the purpose is to accurately predict data transmitted from a transmitter in a communication system by a receiver, it is preferable to perform learning using supervised learning rather than unsupervised learning or reinforcement learning.

The learning model corresponds to the human brain, and although the most basic linear model may be considered, a paradigm of machine learning that uses a neural network structure with high complexity such as artificial neural networks as a learning model is referred to as deep learning.

The neural network cord used in the learning method is largely classified into deep neural networks (DNN), convolutional deep neural networks (CNN), and recurrent Boltzmann machine (RNN), and this learning model may be applied.

Terahertz (THz) Communication

THz communication is applicable to the 6G system. For example, a data rate may increase by increasing bandwidth. This may be performed by using sub-TH communication with wide bandwidth and applying advanced massive MIMO technology.

Figure 9:
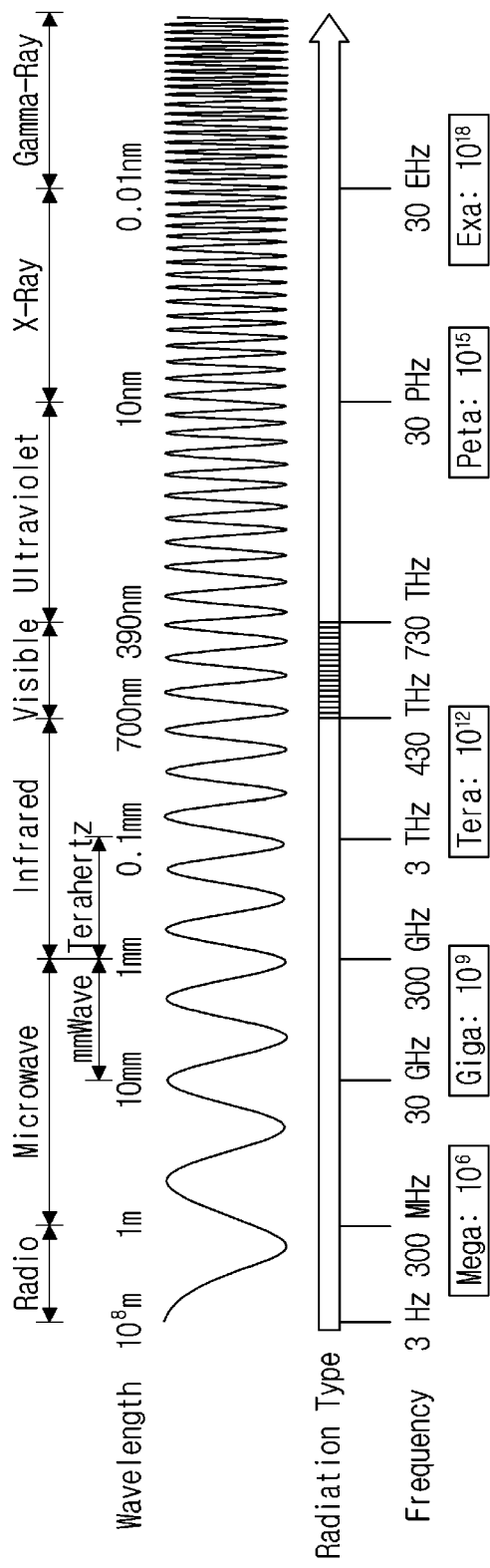
FIG. 9 is a view showing an electromagnetic spectrum applicable to the present disclosure.

FIG. 9 is a view showing an electromagnetic spectrum applicable to the present disclosure. For example, referring to FIG. 9, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz Wireless Communication

FIG. 10 is a view showing a THz communication method applicable to the present disclosure.

Referring to FIG. 10, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

Specific Embodiments of the Present Disclosure

The present disclosure is to implement a power shared model based on mobility devices (e.g., drones, unmanned aerial vehicles) for efficient power supply and demand in a wireless communication system. Through the power shared model, devices can share power with each other in a wireless communication system, for example, in a massive IoT environment. According to various embodiments, a device with surplus power may supply power, and a device with insufficient power may receive power. Through this, low-power small personalized devices (e.g., wireless earphones, fitness bands, wearable devices, etc.) may be driven only with the power received, enabling efficient battery-free design. Expansion of space and devices to which various embodiments are applied may become the cornerstone of new services and business opportunities.

One of the key performance indicators (KPIs) of 6G is achieving extremely low power. The design of low-power or battery-free individual devices will be a key enabler for various services in the massive Internet of things (IoT). Additionally, from the recently highlighted ESG (environment, social, governance) perspective, the design of battery-free devices will be key. Currently, related technologies to implement this include low-power design technologies such as RF (radio frequency) wireless power transmission, energy harvesting (e.g., technology to collect and store external energy such as solar energy or human kinetic energy), backscatter, etc. However, in most cases, the collected power is at a low level of μW to mW at a distance of 1 m, and the amount of received power decreases as the distance from the power transmitter increases, so the utilization of power is low.

Although technology for wireless power transmission currently exists, a short-range magnetic induction method has short coverage and thus is mostly used only in the form of short-distance contact. On the other hand, the RF (radio frequency) method is capable of transmitting power over long distances, but has disadvantages such as limited output of the transmitter and a large decrease in received power depending on the distance. Accordingly, there is currently no suitable alternative to long-distance wireless power transmission, and thus technical limitations exist in the design of battery-free devices. For reference, the RF method is inversely proportional to the square of the distance between the transmitter and receiver, as shown in [Equation 1] below.

$$P_r = A_e \cos^2\phi \frac{P_t G_t}{4\pi R^2}$$ [Equation 1]

$$A_e = \lambda 2 G_r / 4\pi$$

In [Equation 1], $P_r$ is the amount of received power in wireless power transmission, $A_e$ is an antennas' effective area, Pt is the output power amount of the transmitting antenna, $G_r$ is the gain of the receiving antenna, $G_t$ is the gain of the transmitting antenna, $\lambda$ is the wavelength, R is a distance between the transmitter and the receiver, and $\cos\Phi$ is a polarization loss factor.

In order to solve this problem, the present disclosure proposes mobility wireless power shared model as technology that can implement extremely low power to increase power efficiency by allowing various devices coexisting in a local area to receive insufficient power from each other and transfer idle power to each other.

Figure 11:
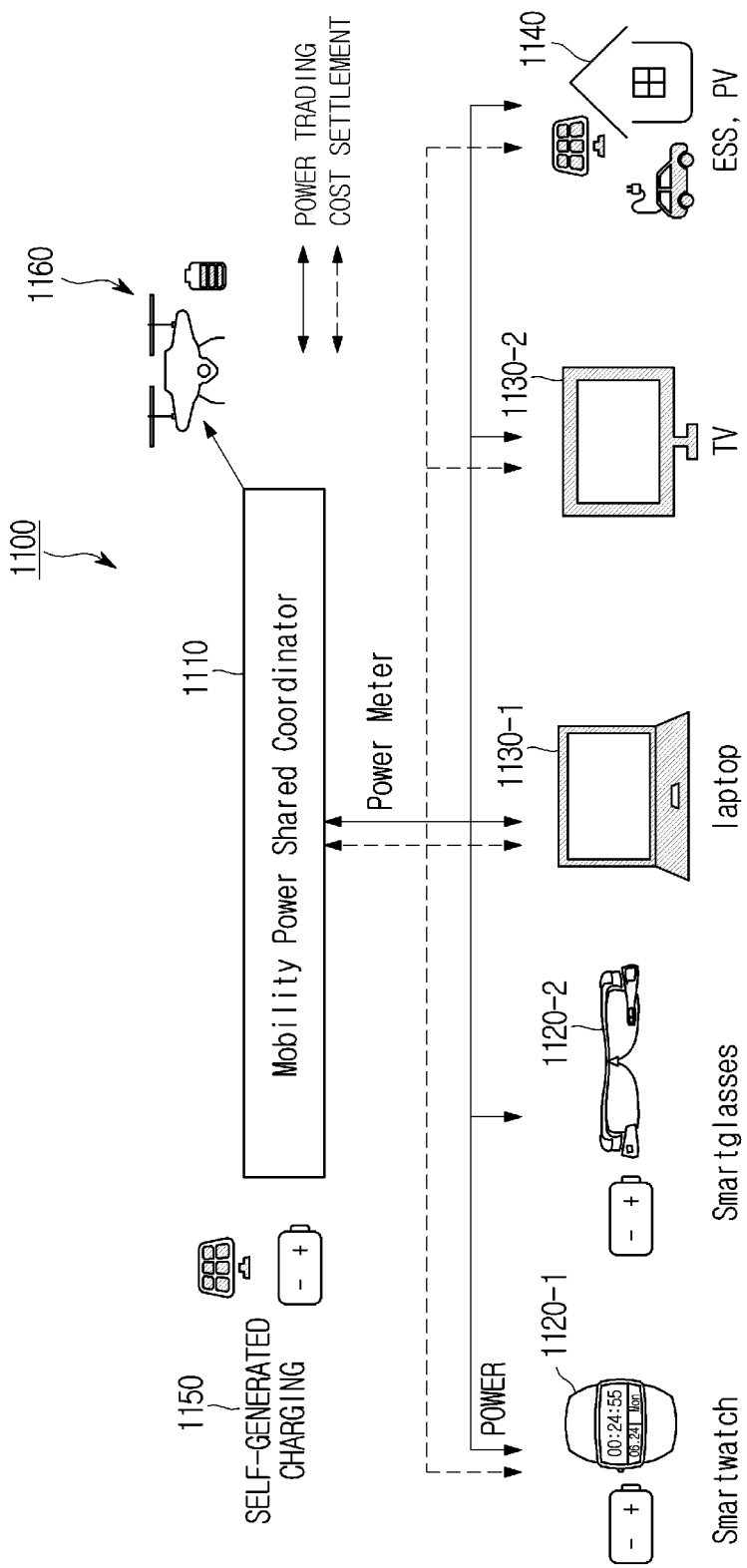
FIG. 11 illustrates the concept of a mobility power shared model according to an embodiment of the present disclosure.

FIG. 11 illustrates the concept of a mobility power shared model according to an embodiment of the present disclosure.

Referring to FIG. 11, in the mobility power shared model 1100, a mobility power shared coordinator (hereinafter referred to as 'mobility coordinator') 1110 shares power through compatibility with other devices driven by power. The mobility coordinator 1110 realizes a mobility power shared model through wireless power transmission. The mobility coordinator 1110 may check the amount of power of peripheral devices and redistribute available power (e.g., surplus power) to devices with insufficient power, thereby increasing the efficiency of power management through resupply of power. At this time, the closer the distance between the power transmitter and receiver, the higher the efficiency of power transmission and reception, so the mobility coordinator 1110 moves to the other devices according to a path set based on priority for power transmission and reception, thereby increasing the efficiency of power transmission and reception. As an example, the device performing the role of the mobility coordinator 1110 may be a separate device (e.g., a drone, an unmanned aerial vehicle, UAV), as shown in the example of FIG. 11.

The mobility coordinator 1110 may receive power from peripheral devices, but may also generate and transmit power through self-generated charging 1150 such as solar power. In addition, the mobility coordinator 1110 may supply power through a separate power generation or storage device 1140, such as an energy storage system (ESS) or photovoltaic (PV).

As an example, peripheral devices are devices connected to power in a specific space in the house and may include a TV 1130-2, a refrigerator, a washing machine, a set-top box, an Internet router, a laptop 1130-1, etc. Additionally, peripheral devices may be battery-based, low-power personal portable devices, such as a fitness band, a smart watch 1120-1, a wireless earphone, smart glasses 1120-2, a wearable device, etc.

Figure 12:
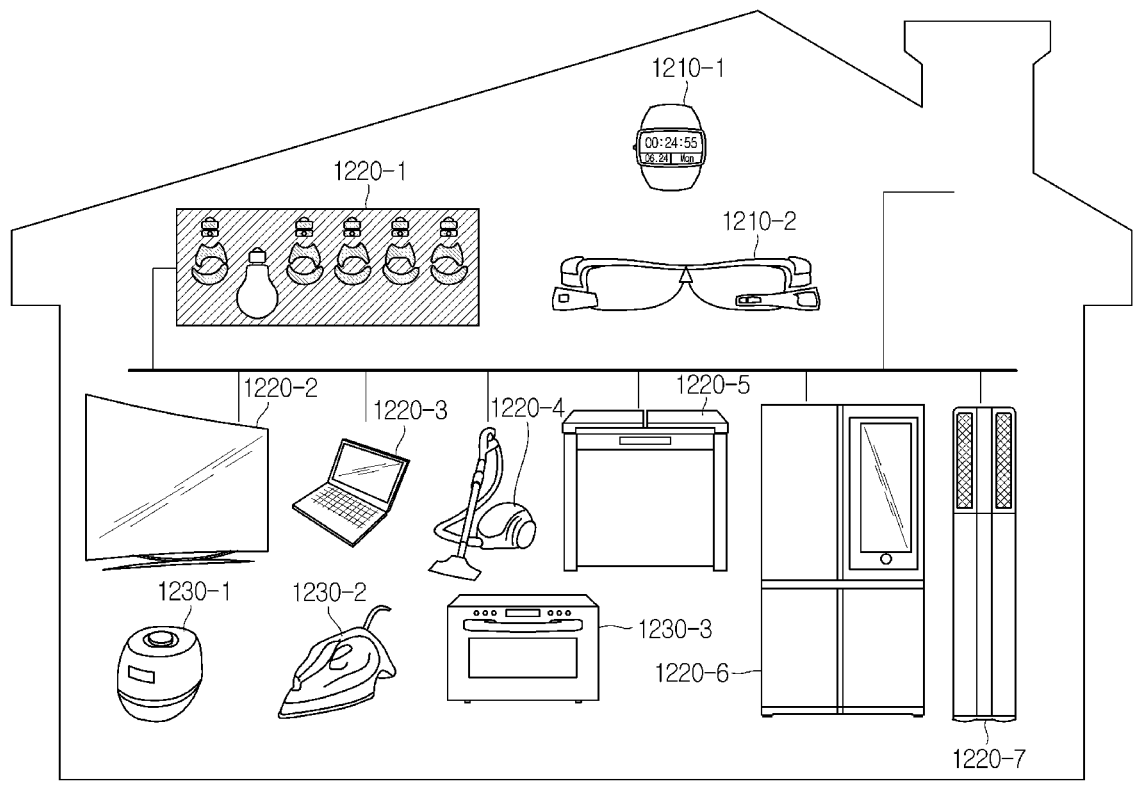
FIG. 12 shows an example of a home network in which a mobility power shared model according to an embodiment of the present disclosure may be utilized.

FIG. 12 shows an example of a home network in which a mobility power shared model according to an embodiment of the present disclosure may be utilized.

Referring to FIG. 12, devices that use power include wired power devices such as a lighting 1220-1, a TV 1220-2, a laptop 1220-3, a vacuum cleaner 1220-4, a kimchi refrigerator 1220-5, a refrigerator 1220-6 and an air conditioner 1220-7. Alternatively, devices that use power include low-power battery-based devices such as a smart watch 1210-1 and smart glasses 1210-2. Alternatively, devices that use power include wireless home appliances such as a wireless rice cooker 1230-1, a wireless iron 1230-2, and a wireless oven 1230-2.

Generally, home appliances in the house are equipped with communication modules (e.g., Wi-Fi, BT, Zigbee, Lora), and mobile phones also include cellular (e.g., LTE, LTE-A, 5G) communication modules. Since the energy transmission unit can be implemented based on an existing communication module, any device will be able to transmit and receive energy by applying the energy collection unit to the receiver of the device. For example, the energy receiving unit and the battery may be designed to have a piggyback option as needed. In other words, each device may be equipped with power reception and storage functions by attaching an additional device (e.g., a dongle) including one of the energy receiving unit and the battery, for example.

Examples of wireless power transmission technologies applicable to wireless communication systems according to various embodiments are shown in [Table 2] below. However, technologies other than the wireless power transmission technologies listed in [Table 2] below may also be applied to wireless communication systems according to various embodiments.

TABLE 2

|  | Method 1 | Method2 | Method 3 | Method 4 | Method 4 |
|---|---|---|---|---|---|
| Medium | RF | RF | RF | Infrared ray | Ultrasonic wave |
| Technology | 3 W TX transmission in 915 MHz, and receiving antenna optimization | Focus on optimal path setting function to safely transmit power using Lytro camera principle | Use 24 antenna transmission array in 5.8 GHz Wi-Fi band | The transmitter is composed of a retroreflection mirror and a light source, and the receiver generates power using ring resonance | Form ultrasonic beam through thousands of small speakers |
| Wireless Frequency | 915 MHz | 2.4 GHz | 5.8 GHz Wi-Fi | Infrared ray | Ultrasonic wave 45 kHz~75 kHz |
| Distance (Max) | 1 m | 1 m | 1 m | 1 m | 3 m |
| MaxTX Power | μW~mW | ~mW | ~mW | 1 W | ~mW |
| Limitation/ remark (human body influence, frequency interfere) | A typical mobile phone user will receive far more RF energy from their own mobile phone than they will from a properly installed Powercast transmitter. | Wireless Power delivers meaningful power to devices at a distance while meeting all of the FCC's stringent Specific Absorption Rate (SAR) requirements for safety. | RF exposure is always below, and usually substantially lower than FDA, FCC and International limits. | Operates only in LOS, and is disadvantageous in high power transmission | Transmission efficiency is not good |

Figure 13:
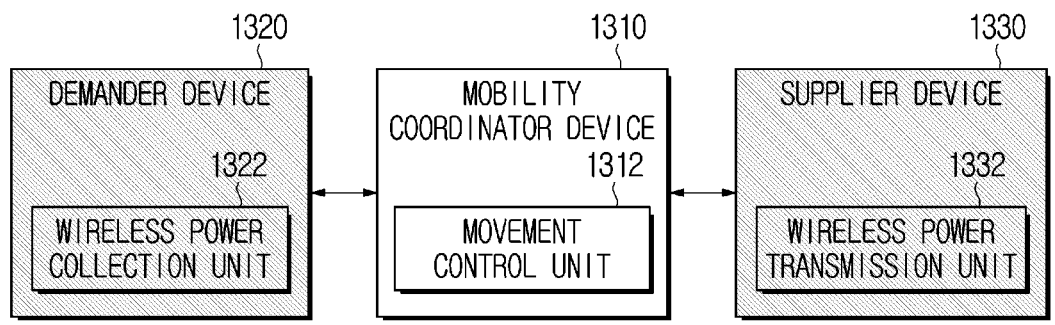
FIG. 13 shows a schematic structure of a wireless communication system according to an embodiment.

FIG. 13 shows a schematic structure of a wireless communication system according to an embodiment. FIG. 13 illustrates the structure of a wireless communication system supporting wireless power sharing.

Referring to FIG. 13, the wireless communication system includes a mobility coordinator device 1310, a demander device 1320, and a supplier device 1330.

The mobility coordinator device 1310 manages the power of devices within the network. For example, the mobility coordinator device 1310 may check the power status of devices in the network, monitor the remaining amount of power, and relay power. The mobility coordinator device 1310 may include a movement control unit 1312 that controls movement to the supplier device 1330 and the demander device 1320 to transmit and receive power. According to an embodiment, the mobility coordinator device 1310 receives surplus power from the supplier device 1330 and transmits power to the demander device 1320 with insufficient power. In this way, the mobility coordinator device 1310 can increase power use efficiency by controlling the power sharing procedure within the network.

At this time, the longer the distance between devices that wirelessly transmit and receive power, the lower the efficiency of wireless power transmission and reception. Accordingly, according to various embodiments, for efficiency of wireless power transmission and reception, the mobility control unit 1312 controls the mobility coordinator device 1310 to move to the demander device 1320 and the supplier device 1330. As an example, the movement control unit 1312 may include a rotor, a motor, a sensor, etc. The movement control unit 1312 may variably use the rotational force of the rotor generated by operating the motor to perform a movement operation of the mobility coordinator device 1320. At this time, a brushless motor with excellent rotational force and torque may be used to rotate the rotor. The sensor may be used to stabilize the posture of the mobility coordinator device 1320 by calculating the tilt, speed, direction of movement, and altitude information of the mobility coordinator device 1320. The sensor may include an accelerometer that detects forward, backward, left and right, and up and down movements in 3D space, and a gyroscope that measures rotational force and detects the 3-axis rotational movement of the aircraft, such as roll, pitch, and yaw, a geomagnetic sensor that measures the Earth's magnetic field and recognizes the direction of movement of the mobility coordinator device 1310, etc.

The demander device 1320 is a device that demands power. That is, the demander device 1320 includes all devices that require power. The demander device 1320 may include a wireless power collection unit 1322 that detects and stores power supplied through wireless signals. The demander device 1320 transmits power information to the coordinator device 1310 and receives insufficient power. The demander device 1320 may be a device that uses a battery as a power source, and in some cases, a small-capacity super capacitor rather than a battery may be used as a power source.

The supplier device 1330 is a device that supplies power. The supplier device 1330 may include a wireless power transmission unit 1332 that transmits power through wireless signals. The supplier device 1330 transmits power information to the coordinator device 1310 and supplies available surplus power.

The demander device 1320 and the supplier device 1330 are relative concepts determined depending on the situation. Either device may function as a demander device 1320 or a supplier device 1330 depending on the power situation. For example, a low-power device that is generally driven by a battery, such as a smart watch, smart glasses, or a fitness band, may operate as the demander device 1320. A wearable device (e.g., smart glasses, a fitness band, a smart watch) may support a wireless power transmission function according to user settings, and in this case, the wearable device may be the demander device 1320. However, the present disclosure is not limited thereto, and any one of various devices using power may operate as the demander device 1320. Additionally, for example, smart home appliances, TVs, refrigerators, air conditioners, washing machines, etc. equipped with wireless communication modules may operate as the supplier device 1330 according to user settings. However, the present disclosure is not limited thereto, and any one of various devices using power may operate as the supplier device 1330.

Figure 14:
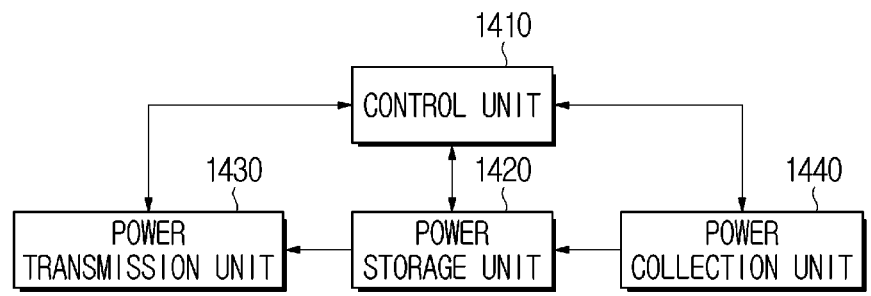
FIG. 14 shows the structure of a device in a wireless communication system according to an embodiment.

FIG. 14 shows the structure of a device in a wireless communication system according to an embodiment. FIG. 14 shows the functional structure of a mobility coordinator device (e.g., the mobility coordinator device 1310 of FIG. 13), a demander device (e.g., the demander device 1320 of FIG. 13), or a supplier device (e.g., the supplier device 1330 of FIG. 13), as devices that can participate in power sharing.

Referring to FIG. 14, the device includes a control unit 1410, a power storage unit 1420, a power transmission unit 1430 and a power collection unit 1440.

The control unit 1410 controls the overall operations of the device. For example, the control unit 1410 may control other components to collect power from other devices and store the collected power. Additionally, the control unit 1410 may control other components to perform a function of supplying stored power to other devices. To this end, the control unit 1410 may include memory, at least one processor, etc. For example, in the case of the mobility coordinator device 1310, the control unit 1410 may control the mobility coordinator device 1310 to move to the demander device 1320 or the supplier device 1330 to increase the efficiency of wireless power transmission.

The power storage unit 1420 stores power. The power storage unit 1420 may include at least one of a battery or a super capacitor. The power storage unit 1420 may store surplus power supplied from another device, surplus power supplied from an external power source, etc. for power resupply.

The power transmission unit 1430 transmits power through wireless signals. The power transmission unit 1430 may transmit surplus power to a device that has demanded power (e.g., demander device, coordinator device). The power stored in the power storage unit 1420 is transmitted to other devices through the power transmission unit 1430.

The power collection unit 1440 collects power supplied through wireless signals. The power collection unit 1440 receives surplus power from other devices (e.g., supplier device, coordinator device). Power received from the supplier device is stored in the power storage unit 1420.

The structure shown in FIG. 14 may be understood as one of a coordinator device, a demander device, and a supplier device. However, according to another embodiment, in the case of the demander device, the power transmission unit 1430 may be excluded. Similarly, according to another embodiment, in the case of the supplier device, at least one of the power storage unit 1420 or the power collection unit 1440 may be excluded.

The device illustrated in FIG. 14 may be a device that performs other functions in addition to power sharing. Accordingly, the device may further include at least one component for a different function (e.g., a function depending on the purpose of the device) in addition to the components shown in FIG. 14.

Additionally, signaling of power information may be performed for power sharing. To this end, although not shown in FIG. 14, the device may further include a transceiver capable of transmitting and receiving control information. Here, the transceiver is implemented as hardware separate from the power transmission unit 1430 and the power collection unit 1440, or at least some of the hardware circuits (e.g., antennas, lines, filters, etc.) that make up the transceiver may be shared with the circuit of the power transmission unit 1430 and the power collection unit 1440.

Figure 15:
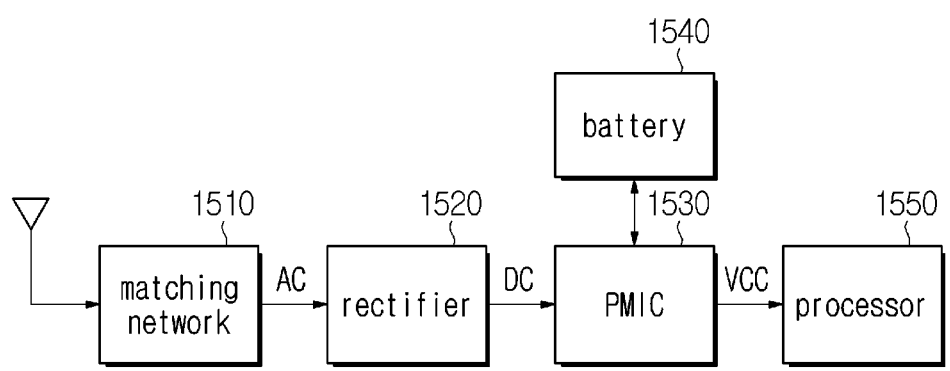
FIG. 15 shows an example of the configuration of a circuit for receiving and generating power in a wireless communication system according to an embodiment.

FIG. 15 shows an example of the configuration of a circuit for receiving and generating power in a wireless communication system according to an embodiment.

Referring to FIG. 15, the circuit for receiving and generating power includes a matching network 1510, a rectifier 1520, a power management integrated circuit (PMIC) 1530, and a battery 1540, and a processor 1550. The circuit for receiving and generating power is needed to receive and generate wireless power.

The matching network 1510 performs impedance matching between the antenna and the receiving circuit. The rectifier 1520 rectifies an alternative current (AC) signal. That is, the rectifier 1520 converts the AC signal into a DC (direct current) signal. The PMIC 1530 manages power. The PMIC 1530 converts and supplies input power into voltage or current required by other components that use power. The battery 1540 is charged using power provided from the PMIC 1530, and supplies the charged power to the PMIC 1530. The processor 1550 consumes power supplied from the PMIC 1530 to perform necessary operations.

When receiving power through a wireless signal, the RF wireless power signal received through the antenna is converted into AC power with minimized loss through the matching network 1510. AC power is converted into direct current power through the rectifier 1520, and the direct current power may be used as system supply power required for the processor 1550 through the PMIC 1530 or stored in the battery 1540 as surplus power. That is, the energy collected through the circuit for receiving and generating power may be used by the processor 1550 directly through the PMIC 1530, or may be stored in the battery 1540 and then used by the application circuit 1550.

Figure 16:
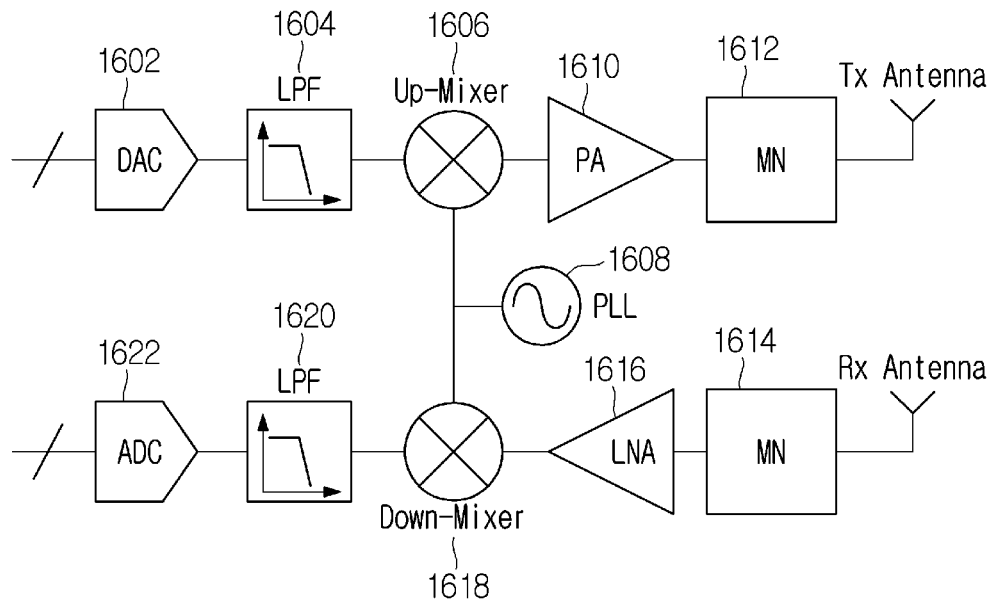
FIG. 16 shows an example of the configuration of a transceiver circuit in a wireless communication system according to an embodiment.

FIG. 16 shows an example of the configuration of a transceiver circuit in a wireless communication system according to an embodiment. Referring to FIG. 16, the transceiver circuit is a transmission chain, including a digital to analog convertor (DAC) 1602 that converts a digital signal into an analog signal, a low pass filter (LPF) 1604 that passes components in a low frequency band, a mixer 1606 for frequency up-conversion, a phase lock loop (PLL) 1608 for generating a local frequency signal for frequency conversion, a power amplifier (PA) 1610 for amplifying a transmitted signal, and a matching network 1612 for transmission impedance matching. The transceiver circuit is a reception chain, including a matching network 1614 for reception impedance matching, a low noise amplifier (LNA) 1616 for amplifying a received signal, a mixer 1618 for frequency down-conversion, an LPF 1620 that passes component in a low frequency band and an analog to digital convertor ADC 1622 that converts an analog signal into a digital signal.

Figure 17:
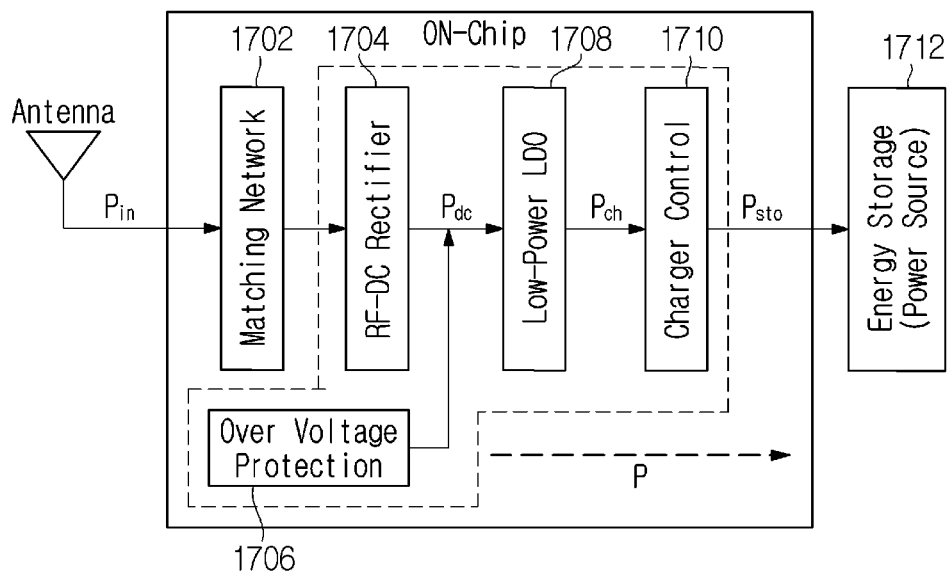
FIG. 17 shows an example of the functional configuration of an energy reception circuit in a wireless communication system according to an embodiment.

FIG. 17 shows an example of the functional configuration of an energy reception circuit in a wireless communication system according to an embodiment. Referring to FIG. 17, the energy reception circuit includes a matching network 1702 for impedance matching, an RF-DC (direct current) rectifier 1704 for converting alternating current to direct current, and an overvoltage protection circuit 1706 that blocks a signal when a voltage exceeding a threshold for circuit protection is generated, a low-power low drop out (LDO) circuit 1708 that generates a signal with a voltage for charging, a charger control circuit 1710 that controls supply of the signal for charging, and an energy storage circuit 1712 that stores surplus power and functions as a power source for other circuits.

Figure 18:
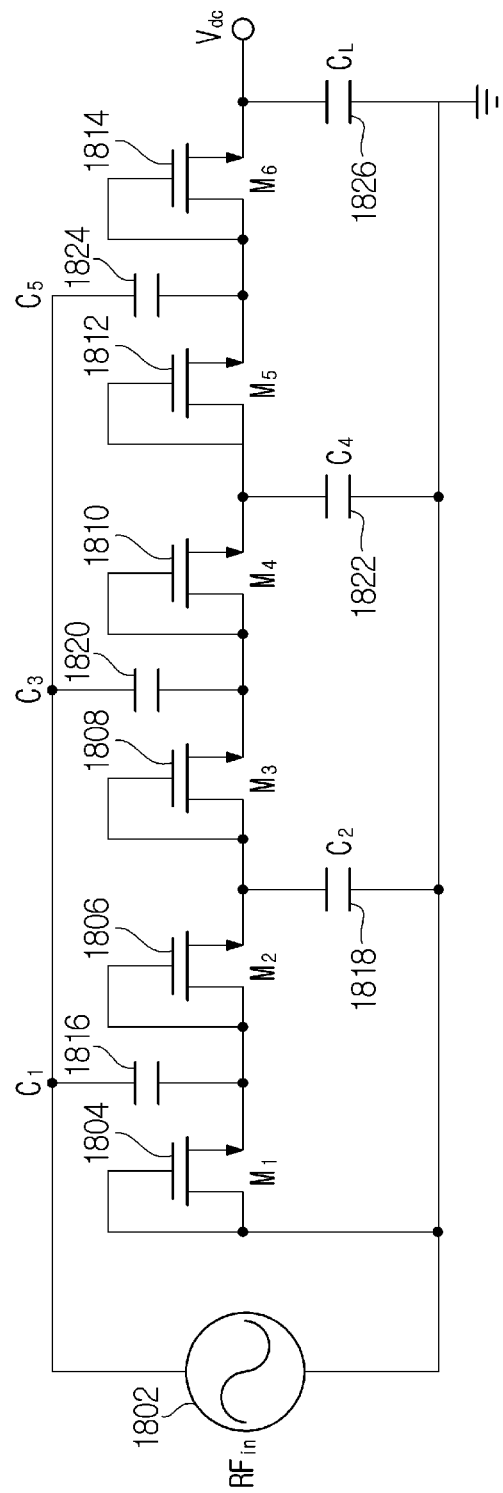
FIG. 18 shows an example of the configuration of a rectifier circuit included in an energy reception circuit in a wireless communication system according to an embodiment.

FIG. 18 shows an example of the configuration of a rectifier circuit included in an energy reception circuit in a wireless communication system according to an embodiment. The rectifier circuit illustrated in FIG. 18 may be understood as an example of the RF-DC rectifier 1704 of FIG. 17. Referring to FIG. 18, the rectifier circuit includes metal-oxide-semiconductor field-effect transistors (MOS-FETs) 1804, 1806, 1808, 1810, 1812 and 1814 arranged between one end and the output end of the RF input 1802 and capacitors 1816, 1818, 1820, 1822, 1824, 1826, in order to rectify the RF input 1802. One ends of the capacitors 1816, 1818, 1820, 1822, 1824 and 1826 are connected to the source terminal of each of the MOSFETs 1804, 1806, 1808, 1810, 1812 and 1814, and the other ends of some capacitors 1818, 1822 and 1826 are connected to one end of the RF input 1802, and the other ends of the remaining capacitors 1816, 1820, and 1824 are connected to the other end of the RF input 1802.

Figure 19:
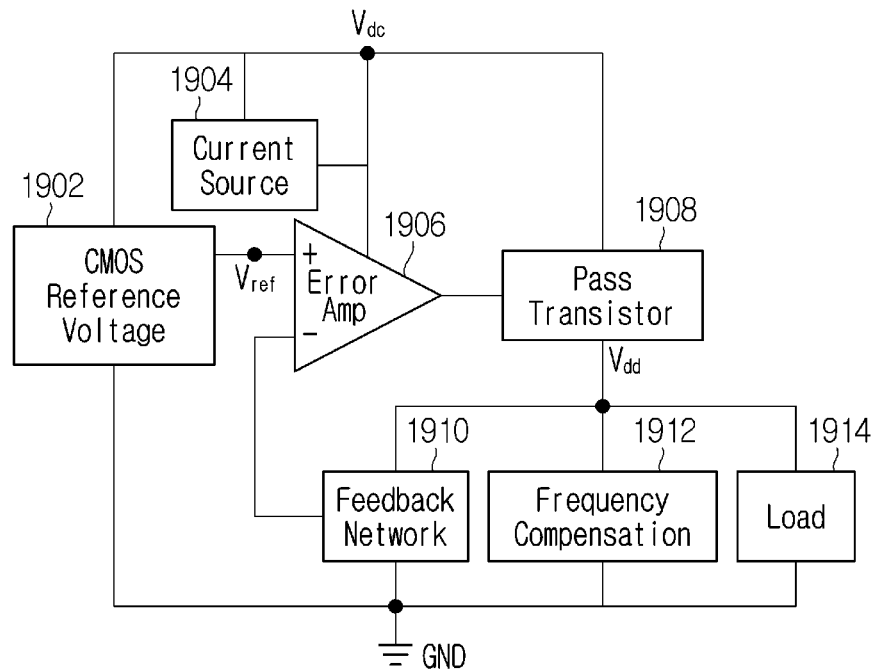
FIG. 19 shows an example of the configuration of an LDO regulator circuit included in an energy reception circuit in a wireless communication system according to an embodiment.

FIG. 19 shows an example of the configuration of an LDO regulator circuit included in an energy reception circuit in a wireless communication system according to an embodiment. The LDO regulator circuit illustrated in FIG. 19 may be understood as an example of the low-power LDO circuit 1708 of FIG. 17. Referring to FIG. 19, the LDO regulator circuit includes a CMOS reference voltage source 1902, a current source 1904, an error amplifier 1906, a pass transistor 1908, and a feedback network 1910, a frequency compensation circuit 1912, and a load 1914. The CMOS reference voltage source 1902 generates a reference voltage $V_{ref}$ and inputs it to the positive (+) terminal of the error amplifier 1906. The negative (−) terminal of the error amplifier 1906 is connected to the feedback network 1910. When comparing the reference voltage $V_{ref}$ and the feedback value, a voltage difference between the positive and negative terminals is amplified to the output voltage of the error amplifier 1906, and the output voltage is connected to the pass transistor 1908. The pass transistor 1908 supplies a stable supply voltage $V_{dd}$ by controlling the current flow to the load 1914 through the pass transistor 1908.

Figure 20:
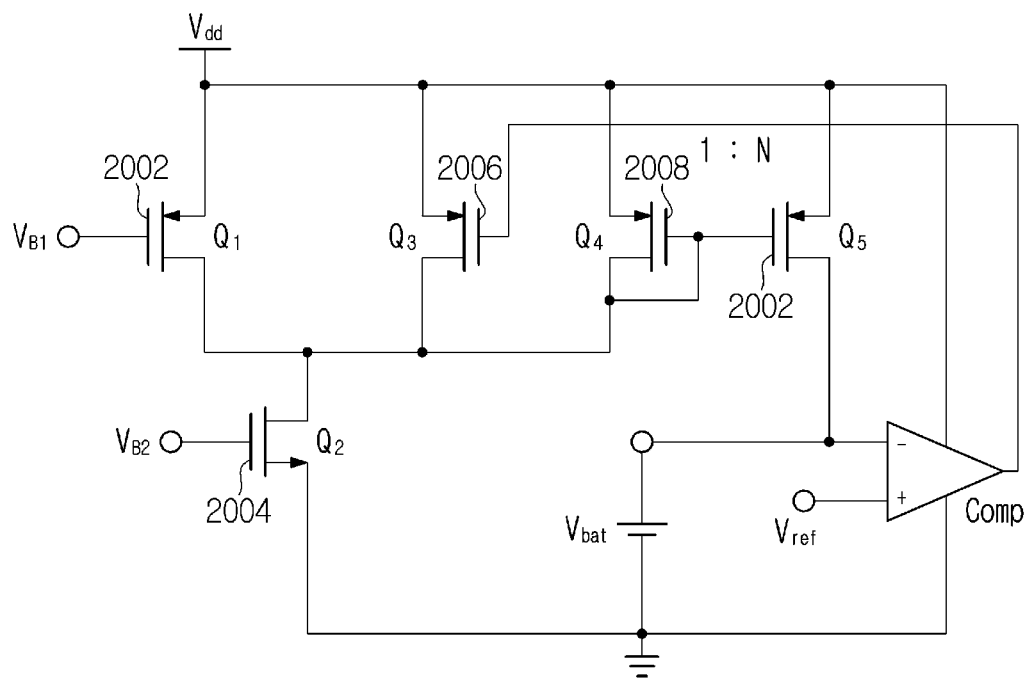
FIG. 20 shows an example of the configuration of a charging control circuit included in an energy reception circuit in a wireless communication system according to an embodiment.

FIG. 20 shows an example of the configuration of a charging control circuit included in an energy reception circuit in a wireless communication system according to an embodiment. The charging control circuit illustrated in FIG. 20 may be understood as an example of the charger control circuit 1710 of FIG. 17. Referring to FIG. 20, the charging control circuit includes a plurality of transistors 2002, 2004, 2006, 2008 and 2010 and a comparator 2012. The transistor 2002 and the transistor 2006 form a differential pair Q1-Q3, and the transistor 2008 and the transistor 2010 form a current mirror Q4-Q5. The comparator 2012 prevents battery overcharging. The battery (e.g., the energy storage circuit 1712 in FIG. 17) may be charged using constant current generated by the transistor 2002 and the transistor 2004 using two bias voltages (e.g., VB1 and VB2). When the battery voltage $V_{bat}$ is lower than the reference voltage $V_{ref}$, the output voltage of the comparator 2012 becomes high and the transistor 2006 is turned off. Two constant currents from the transistor 2002 and the transistor 2008 flow simultaneously into the transistor 2004. The conduction current from the transistor 2010 is amplified when passing through a current mirror. The amplified current may quickly charge the battery. If $V_{bat}$ is higher than $V_{ref}$, the output voltage of the comparator 2012 becomes low and the transistor 2006 is turned off. Two constant currents from the transistor 2002 and the transistor 2006 flow simultaneously into the transistor 2004. Additionally, the transistor 2008 and the transistor 2010 are turned off, and the battery is no longer charged.

Figure 21:
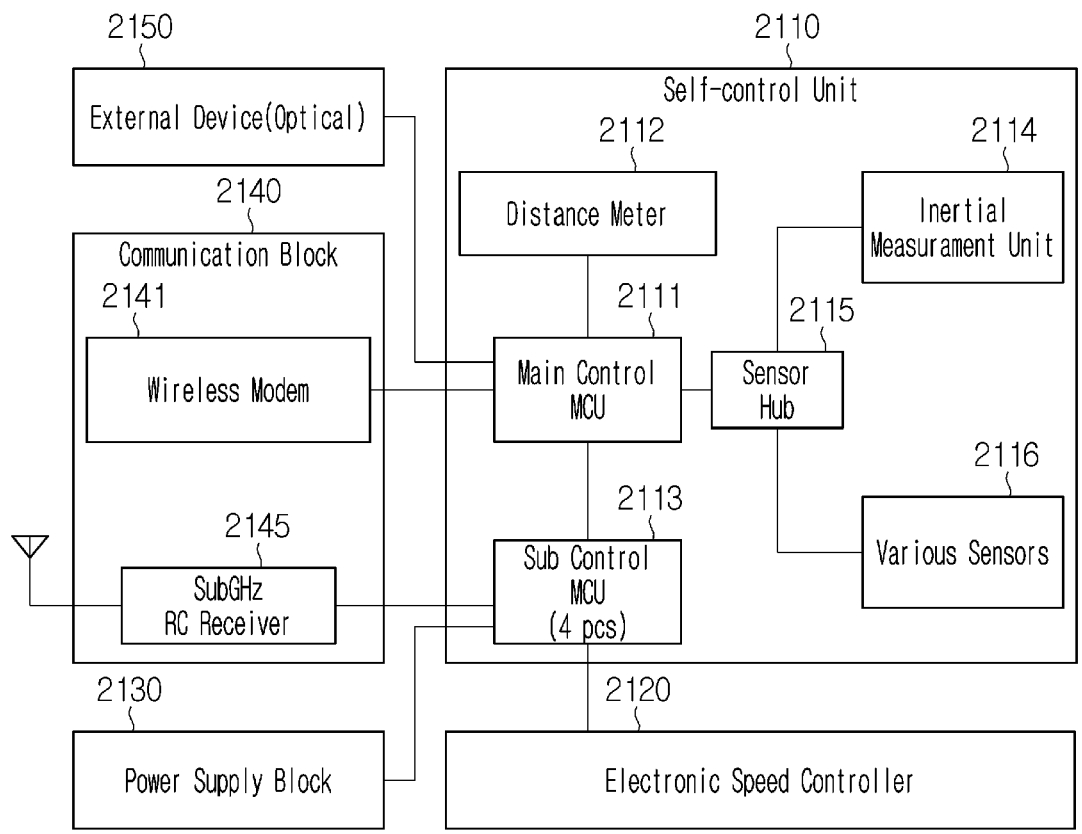
FIG. 21 shows an example of the structure of a mobility device according to an embodiment.

FIG. 21 shows an example of the structure of a mobility device according to an embodiment. The mobility device of FIG. 21 may operate as a mobility coordinator device (e.g., mobility coordinator device 1310 of FIG. 13). As an example, the mobility device may be a drone or unmanned aerial vehicle.

Referring to FIG. 21, the mobility device 2100 includes a self-control unit 2110, an electronic speed controller 2120, and a power supply block 2130, a communication block 2140, and an external device 2150.

The self-control unit 2110 controls operation of the mobility device 2100 using a main control microcontroller unit (MCU) 2111, a sub control MCU 2113, and a sensor hub 2115. As an example, the main control MCU 2111 may control operation of a distance meter 2112, a communication block 2140, an external device 2150, a sensor hub 2115, and a sub control MCU 2113. The distance meter 2112 may measure a distance between the mobility device 2100 and a peripheral device through a photo diode or laser diode. The communication block 2140 may communicate with an external device using a wireless modem 2141 and a sub-gigahertz resistance-capacitance (RC) receiver 2145. For example, a wireless modem 2141 may support SubGHz, Wi-Fi (wireless fidelity), and Bluetooth functions for aviation control. The external device 2150 is a device that can be optionally added and may include a camera 2151.

The sensor hub 2115 may control operation of an inertial measurement unit 2114 and various sensors 2116. As an example, the inertial measurement unit may include a gyroscope, an accelerometer, or a magnet. The various sensors 2116 may include a pressure sensor, a temperature sensor, a hall sensor, or an ultrasonic sensor.

The sub-control MCU 2113 may control an electronic speed controller 2120 and a power supply block 2130. The electronic speed controller 2120 may control the movement speed of the mobility device 2100. The electronic speed controller 2120 may include an MCU, an operational amplifier (OP AMP), a gate driver, a brushless motor, an accelerometer, a metal oxide semiconductor field effect transistor (MOSFET), and a shunt resistor. The power supply block 2130 may supply power necessary for the mobility device 2100 to operate. The power supply block 2130 may include a lithium-ion battery, a battery monitor, a universal serial bus-power delivery (USB-PD), a wireless charger, a direct current converter, and a battery charger.

Figure 22:
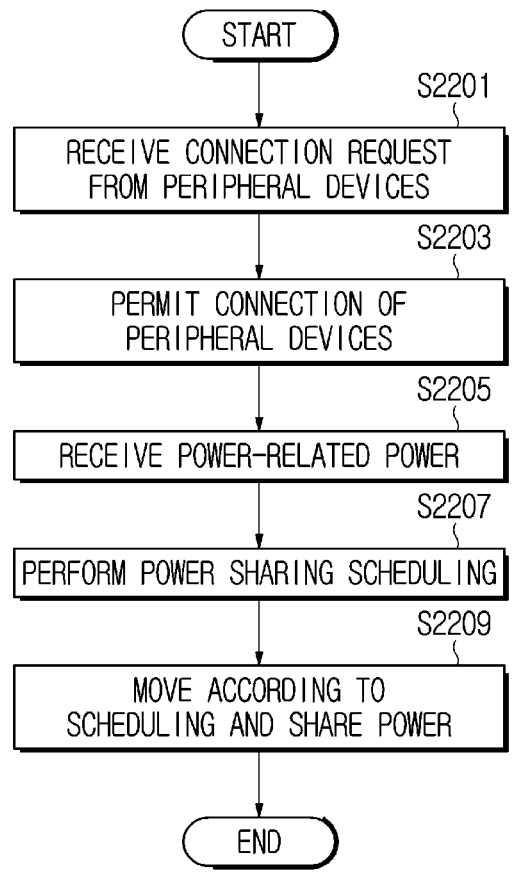
FIG. 22 shows an example of a procedure for managing power in a wireless communication system according to an embodiment.

FIG. 22 shows an example of a procedure for managing power in a wireless communication system according to an embodiment. FIG. 22 illustrates a method of operating a mobility coordinator device.

Referring to FIG. 22, in step S2201, the mobility coordinator device receives a connection request from peripheral devices. The connection request is a message transmitted by the peripheral devices to request registration from the mobility coordinator device. As an example, the mobility coordinator device may scan the peripheral devices, perform a synchronization procedure with the peripheral devices, and then receive the connection request from the peripheral devices.

In step S2203, the mobility coordinator device permits connection of the demander device and the supplier device. The mobility coordinator device may scan the peripheral devices and permit the connection based on the received connection request. Specifically, the mobility coordinator device may register the peripheral devices as the supplier device or the demander device and establish links with the peripheral devices, by permitting the connection. The mobility coordinator device may register all peripheral devices or selectively register them according to user settings.

In step S2205, the mobility coordinator receives power-related information from the peripheral devices. That is, the mobility coordinator device may request and receive information necessary for wireless power sharing from the peripheral devices. For example, the power information may include at least one of supply power, demand power, a distance from the coordinator device, a power source type, wireless power transmission type, or wireless power transmission frequency information.

In step S2207, the mobility coordinator performs power sharing scheduling. That is, the mobility coordinator device performs scheduling to share wireless power based on the collected power-related information. Specifically, the mobility coordinator device may determine how much power to receive from which device and how much power to supply to which device. According to an embodiment, the mobility coordinator device may determine priorities between a plurality of suppliers and priorities between a plurality of demanders, and sequentially select at least one supplier to supply power and at least one demander to receive power based on the priorities and supply power amounts of the suppliers and the priorities and demand power amounts of the demanders. At this time, the mobility coordinator device may set a movement path based on the determined priorities.

In step S2209, the mobility coordinator moves according to scheduling and shares power. The movement path is determined according to the priorities of peripheral devices assigned according to scheduling. As an example, the mobility coordinator device may determine to move to a high-priority peripheral device first. In other words, the mobility coordinator device moves along a path set based on priority, collects power, and supplies power, thereby redistributing power to the peripheral devices. Specifically, the coordinator device may receive power from the supplier and transmit power to the device. When power sharing is completed, the mobility coordinator device may store surplus power.

Figure 23:
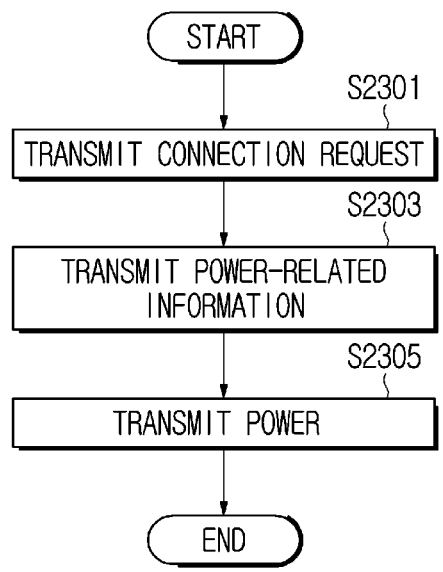
FIG. 23 shows an example of a procedure for supplying power in a wireless communication system according to an embodiment.

FIG. 23 shows an example of a procedure for supplying power in a wireless communication system according to an embodiment. FIG. 23 illustrates a method of operating a supplier device.

Referring to FIG. 23, in step S2301, the supplier device transmits a connection request. That is, the supplier device is registered as a provider in the mobility coordinator device and transmits the connection request to establish at least one link. At this time, the supplier device requests registration as a supplier from the mobility coordinator. Accordingly, when the mobility coordinator device completes registration of the supplier device, at least one link is established between the supplier device and the coordinator device, and wireless power may be shared according to subsequent operations.

In step S2303, the supplier device transmits power-related information. That is, the supplier device may transmit the power-related information to the mobility coordinator device. That is, the supplier device transmits information necessary for wireless power sharing to the mobility coordinator device in response to the request from the mobility coordinator device. For example, the power information may include at least one of supply power, demand power, a distance from the coordinator device, a power type, a wireless power transmission type, or wireless power transmission frequency information.

In step S2305, the supplier device transmits power. According to an embodiment, the supplier device may transmit surplus power arbitrarily. According to another embodiment, the supplier device may transmit power in response to the request from the mobility coordinator device.

Figure 24:
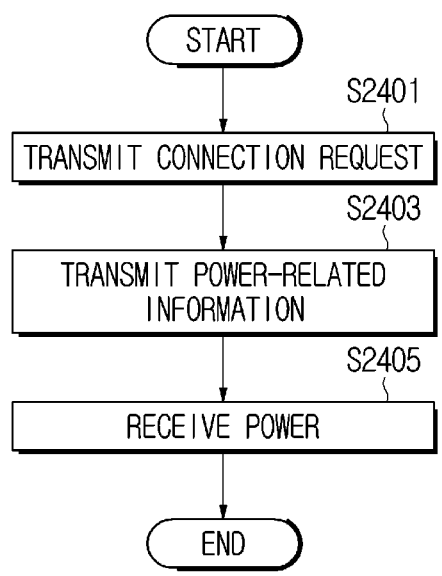
FIG. 24 shows an example of a procedure for receiving power in a wireless communication system according to an embodiment.

FIG. 24 shows an example of a procedure for receiving power in a wireless communication system according to an embodiment. FIG. 24 illustrates a method of operating a demander device.

Referring to FIG. 24, in step S2401, the demander device transmits a connection request. That is, the demander device sends the connection request to register the device and establish at least one link. At this time, the supplier device requests registration as a demander from the mobility coordinator. Accordingly, when the mobility coordinator device completes registration of the demander device, at least one link is established between the demander device and the mobility coordinator device, and wireless power may be shared according to subsequent operations.

In step S2403, the demander device transmits power-related information. That is, the demander device may transmit power information to the mobility coordinator device. That is, the supplier device transmits information necessary for wireless power sharing to the mobility coordinator device in response to the request from the mobility coordinator device. For example, the power information may include at least one of supply power, demand power, a distance from the coordinator device, a power source type, a wireless power transmission type, or wireless power transmission frequency information.

In step S2405, the demander device receives power. Power reception means that the demander device receives power transmitted by the mobility coordinator device. As an example, the demander device may request insufficient power and receive power. Additionally, power may be received arbitrarily according to the power calculation results of the coordinator device.

Figure 25:
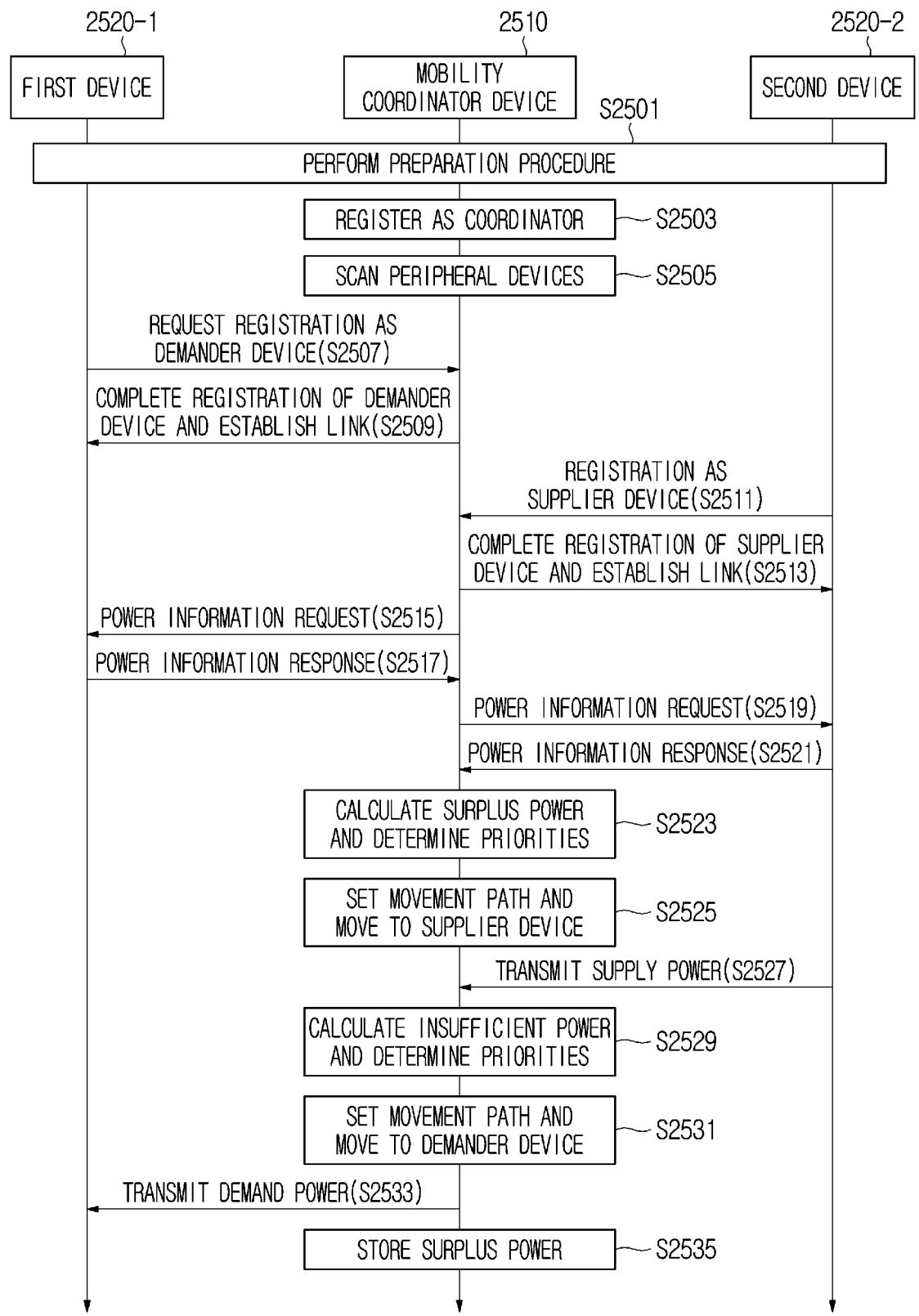
FIG. 25 shows an example of a procedure for power sharing in a wireless communication system according to an embodiment.

FIG. 25 shows an example of a procedure for power sharing in a wireless communication system according to an embodiment. FIG. 25 illustrates signal exchange between a mobility coordinator device 2510, a first device 2520-1, and a second device 2520-2.

Referring to FIG. 25, in step S2501, the mobility coordinator device 2510 performs a preparation procedure. The preparation procedure may be an initial connection procedure for power transmission and reception between a mobility coordinator and a demander device and a supplier device. As an example, the mobility coordinator device may receive a synchronization signal from the demander device or the supplier device and perform a synchronization procedure based on the received synchronization signal. Here, the synchronization signal may be a sidelink synchronization signal (S-SS), and the synchronization procedure may be a sidelink synchronization procedure based on an S-SS/physical synchronization broadcast channel (PSBCH) block.

After performing the preparation procedure, the mobility coordinator device 2510 may receive a control message described later from the demander device and the supplier device. In order to receive the control message, the mobility coordinator device 2510 may receive sidelink control information (SCI) and receive a control message (e.g., device registration request message, power information message) based on resource assignment information included in the SCI.

In step S2503, the mobility coordinator device 2510 is registered as a coordinator. Here, registration as a coordinator may be performed by changing settings according to user input. That is, the coordinator device 2510 includes an interface that may detect user input, and activates a function to manage power distribution according to the user's instruction input through the interface. Although not shown in FIG. 25, according to an embodiment, the mobility coordinator device 2510 may transmit a signal indicating activation of the coordinator function.

In step S2505, the mobility coordinator device 2510 scans peripheral devices. The mobility coordinator device 2510 may perform scanning by checking the presence or absence of signals transmitted from other devices. According to an embodiment, the mobility coordinator device may detect signals transmitted by other devices for purposes unrelated to power distribution for scanning. According to another embodiment, the mobility coordinator device 2510 may detect a signal designed for scanning for power sharing. That is, other devices may transmit signals designed to assist the mobility coordinator device 2510 in scanning. Here, the signal may include a unique sequence indicating that it is a signal for scanning, and may be transmitted in response to a request from the mobility coordinator device 2510 or may be transmitted periodically without a request. Additionally, the mobility coordinator device 2510 may transmit a broadcast signal to trigger a request for registration.

In step S2507, the first device 2520-1 requests registration as a demander device. That is, the first device 2520-1 determines that power needs to be supplemented and requests registration from the coordinator device 2510 to request power. Specifically, the first device 2520-1 transmits a registration request message to the mobility coordinator device 2510. The registration request message may include information on at least one of the identifier of the first device 2520-1, the requesting registration type (e.g., demander or supplier), a device type, a power source type (e.g., battery, super capacitor, external power source, etc.), or a power usage pattern (e.g., power required per unit time, etc.). At this time, the location information of the first device 2520-1 may be stored in the mobility coordinator device 2510 as initial setting information. Thereafter, when the location information of the first device 2520-1 is changed, the new location information may be supplied to the mobility coordinator device 2510.

In step S2509, the mobility coordinator device 2510 completes registration of the first device 2520-1 and then establishes a link. That is, the mobility coordinator device 2510 and the first device 2520-1 perform an association procedure. At this time, multiple links, such as a link for communication and a link for wireless power transmission, may be associated. To this end, a message indicating completion of registration between the mobility coordinator device 2510 and the first device 2520-1 and at least one message for link establishment may be transmitted.

In step S2511, the second device 2520-2 requests registration as a supplier device. That is, the second device 2520-2 determines that power supply is possible and requests registration from the mobility coordinator device 2510 to supply power. Specifically, the second device 2520-2 transmits a registration request message to the coordinator device 2510. The registration request message may include information on at least one of the identifier of the second device 2520-2, the requesting registration type (e.g. demander or supplier), a device type, a power source type (e.g., battery, super capacitor, external power source, etc.), or a power usage pattern (e.g., power required per unit time, etc.). At this time, the location information of the second device 2520-2 may be stored in the mobility coordinator device 2510 as initial setting information. Thereafter, when the location information of the second device 2520-2 is changed, the new location information may be supplied to the mobility coordinator device 2510.

In step S2513, the mobility coordinator device 2510 completes registration of the second device 2520-2 and then establishes a link. That is, the mobility coordinator device 2510 and the second device 2520-2 perform an association procedure. At this time, multiple links, such as a link for communication and a link for wireless power transmission, may be associated. To this end, a message indicating completion of registration between the mobility coordinator device 2510 and the second device 2520-2 and at least one message for link establishment may be transmitted.

In step S2515, the mobility coordinator device 2510 transmits a power information request message to the first device 2520-1. In step S2517, the first device 2520-1 transmits a power information response message to the mobility coordinator device 2510. In step S2519, the mobility coordinator device 2510 transmits the power information request message to the second device 2520-2. In step S2521, the second device 2520-2 transmits the power information response message to the mobility coordinator device 2510. Through steps S2515 to S2521, the mobility coordinator device 2510 may collect control information necessary for power distribution. For example, the control information collected may include at least one of supply power, demand power, a distance, a power source type, a wireless power type, or a wireless power frequency. Here, the supply power refers to the amount of suppliable surplus power, the demand power refers to the amount of insufficient power, and the distance refers to a distance from the mobility coordinator device 2110. In addition, the wireless power frequency refers to a wireless power transmission method, and the wireless power frequency refers to a communication frequency used for RF wireless power transmission in ISM, Wi-Fi, BT, 5G, and 6G. The power source type may be classified into devices driven by power stored in a battery and devices driven by a power source without a battery. The wireless power type may be classified into near field, which is a magnetic induction-based short-distance wireless power transmission method, and far field, which is an RF-based long-distance wireless power transmission method. For example, an example of information collected in the present embodiment is shown in [Table 3] below.

TABLE 3

| Device Class | Distance | Supply Power | Demand Power | Device type | Wireless Power type | Wireless Power Frequency |
|---|---|---|---|---|---|---|
| Coordinator | 1 m | ~μW | ~μW | Battery | Near Field | ~900 MHz |
| Demander | 2 m | ~mW | ~mW | No Battery | Far Field | 2.4 GHz~ 5 GHz |
| Supplier | 3 m | ~W | ~W | | | 28 GHz (mmWave~ THz) |

In step S2523, the mobility coordinator device 2510 calculates surplus power and determines priorities. Specifically, the mobility coordinator device 2510 calculates the amount of surplus power that may be shared by each of the supplier devices including the second device 2520-2 based on the collected power information and determines priorities among the supplier devices. That is, there may be more devices registered as supplier devices other than the second device 2520-2, and accordingly, the coordinator device 2510 may determine which supplier device to receive power from. Here, priority may be determined based on distance, suppliable power amount, power source type, wireless power transmission type, and wireless power transmission frequency information. For example, the closer to the mobility coordinator device 2110, the higher priority is assigned. If the distance is the same, the greater suppliable power amount, the higher the priority is assigned. If suppliable power amount is the same, a higher priority may be assigned to the supplier device using an external power source rather than a battery. In addition, if the power source type is the same, a higher priority is assigned to the supplier device that uses a magnetic induction-based short-distance wireless power transmission method rather than an RF-based long-distance wireless power transmission method. If the wireless power transmission type is the same, the lower the frequency used for wireless power transmission, the higher priority may be assigned. In the present embodiment, the highest priority is assigned to the second device 2120-2. In step S2525, the mobility coordinator device 2510 moves to the second device 2520-2 along the set movement path. The movement path is a path along which the mobility coordinator device 2510 moves to the supplier device in order to efficiently supply and demand power. An optimal path along which the mobility coordinator device 2510 moves may be set according to the priority determined in step S2521. As an example, the mobility coordinator device 2510 may set a movement path to preferentially move to a high-priority supplier device. For example, the mobility coordinator device 2510 may determine a movement path that can sequentially approach the supplier devices according to the priority, based on the terrain of the space, the current location of the mobility coordinator device 2510, and the locations of the supplier devices. To determine the movement path, the mobility coordinator device 2510 may determine a shortest path with multiple destinations (e.g., at least one waypoint and a final destination).

As an example, the mobility coordinator device 2510 may attempt to move in a straight line to the supplier device based on the location information of the supplier device. The mobility coordinator device 2510 may detect obstacles on the movement path using a sensor while moving in a straight line. If an obstacle is detected while moving, the mobility coordinator device 2510 may bypass the obstacle and set anew straight path. Thereafter, when the mobility coordinator device 2510 arrives at the location of the supplier device, it may set a movement path to a supplier device with a next priority and move according to a similar process. In the present embodiment, the coordinator device 2510 moves to the second device 2520-2.

In step S2527, the mobility coordinator device 2510, which has moved along the set path, receives supply power from the second device 2520-2. That is, the mobility coordinator device 2510 receives power through a wireless signal. Although not shown in FIG. 25, prior to receiving power, the mobility coordinator device 2510 may transmit a power request message requesting power to the second device 2520-2. For example, the power request message may include at least one of information about the amount of power demanded and information about a time period for transmitting a signal for transmitting power.

In step S2529, the mobility coordinator device 2510 calculates insufficient power and determines priorities. Specifically, the mobility coordinator device 2510 calculates the insufficient power amount of the demander devices including the first device 2520-1 based on the collected power information and determines priorities among the demander devices. That is, there may be more devices registered as demander devices other than the first device 2520-1, and accordingly, the mobility coordinator device 2510 may determine which demander device to supply power to. Here, priority may be determined based on distance, demand power amount, power source type, wireless power transmission type, and wireless power transmission frequency information. For example, the closer to the mobility coordinator device 2510, the higher priority is assigned. If the distance is the same, the lower the demand power amount, the higher priority is assigned. If the demand power amount is the same, the demander device that does not use an external power source may be assigned a higher priority. In addition, if the power source type is the same, a higher priority is assigned to the demander device that is a magnetic induction-based short-distance wireless power transmission method rather than an RF-based long-distance wireless power transmission method. If the wireless power transmission type is the same, the lower the frequency used for wireless power transmission, the higher priority may be assigned. In the present embodiment, the highest priority is assigned to the first device 2520-1.

In step S2531, the mobility coordinator device 2510 moves to the first device 2520-1 along the set movement path. The movement path is a path along which the mobility coordinator device 2510 moves to the demander device to efficiently transmit power. An optimal path along which the mobility coordinator device 2510 moves may be set according to the priority determined in step S2527. As an example, the coordinator device 2510 may set a movement path to preferentially move to the demander device with the high priority. The mobility coordinator device 2510 may move in a straight line to the demander device based on the location information of the demander device. The location information of the demander device may be stored in the mobility coordinator device 2510 as initial setting information when the demander device is registered in the mobility coordinator device 2510. If the location information of the demander device is changed, the mobility coordinator device 2510 may newly receive the location information of the demander device from the demander device. The mobility coordinator device 2510 may detect obstacles on the movement path using a sensor while moving. When an obstacle is detected while moving, the mobility coordinator device 2510 may set a new straight path by bypassing the obstacle. Thereafter, when the mobility coordinator device 2510 arrives at the location of the demander device, a movement path to another demander device may be set. In the present embodiment, the coordinator device 2510 moves to the first device 2520-1.

In step S2533, the mobility coordinator device 2510 moves along the set path and transmits the demand power to the first device 2520-1. That is, the mobility coordinator device 2510 transmits power through a wireless signal. Although not shown in FIG. 25, prior to transmitting power, the mobility coordinator device 2510 may transmit a power supply message indicating power transmission to the first device 2520-1. For example, the power supply message may include at least one of information about the amount of power supplied and information about a time period for transmitting a signal for transmitting power.

In step S2535, the mobility coordinator device 2510 stores surplus power. After transmitting power to at least one demander device according to the determined priority, some of the received power may remain. In this case, the mobility coordinator device 2510 may store the remaining power in an internal power storage unit (e.g., a battery) or a separate battery storage unit. That is, the surplus power may be stored in a storage unit accessible by the mobility coordinator device. Accordingly, the coordinator device may supply the stored surplus power to the demander in response to a power supply request from the demander later, without requesting power supply to the supplier device.

As described above, power may be shared by management of mobility coordinator devices within the network. In the various embodiments described above, the mobility coordinator device was described as an object separating from the supplier device and the demander device. However, since the mobility coordinator device may also be a device that may move and operate using power, in this case, the mobility coordinator device may also function as a supplier or a demander. That is, the mobility coordinator device may transmit power for other demanders or may receive power from other suppliers.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method performed by a first device in a wireless communication system, the method comprising:
receiving a synchronization signal from a second device and a third device;
performing a synchronization procedure with the second device and the third device based on the synchronization signal;
receiving control information from the second device and the third device;
obtaining scheduling information from the control information; and
receiving power from the second device and transmitting power to the third device while moving based on the scheduling information.

2. The method of claim 1, further comprising:
storing surplus power after transmitting power to the third device.

3. The method of claim 1, wherein the control information comprises at least one of supply power, demand power, a distance, a power source type, a wireless power type or wireless power frequency information.

4. The method of claim 3, wherein wireless power type is classified into near field, which is a magnetic induction-based short-distance wireless power transmission method, and far field, which is an RF-based long-distance wireless power transmission method.

5. The method of claim 1, wherein the checking the scheduling information comprises determining priority of the second device and priority of the third device, and
wherein the priority of the second device and the priority of the third device are determined based on a distance from the first device, a suppliable power amount, a demand power amount, a power source type, a wireless power type and a wireless power frequency.

6. The method of claim 5, wherein the checking the scheduling information further comprises configuring a movement path based on the priority of the second device and the priority of the third device.

7. The method of claim 1, further comprising:
transmitting a broadcast signal to trigger a request for registration of the second device and the third device.

8. The method of claim 1, further comprising:
scanning peripheral devices by detecting signals transmitted from the second device and the third device.

9. The method of claim 1, further comprising:
activating a coordinator function based on user input.

10. A first device in a wireless communication system, the first device comprising:
a transceiver;
a circuit for power reception; and
a processor coupled to the transceiver and the circuit,
wherein the processor is configured to:
receive a synchronization signal from a second device and a third device;
perform a synchronization procedure with the second device and the third device based on the synchronization signal;
receive control information from the second device and the third device;
obtain scheduling information from the control information; and
receive power from the second device and transmit power to the third device while moving based on the scheduling information.

11. The first device of claim 10, wherein the control information comprises at least one of supply power, demand power, a distance, a power source type, a wireless power type or wireless power frequency information.

12. A non-transitory computer-readable medium storing at least one instruction, the non-transitory computer-readable medium comprising the at least one instruction executable by a processor,
wherein the at least one instruction controls a device to:
receive a synchronization signal from a second device and a third device;
perform a synchronization procedure with the second device and the third device based on the synchronization signal;
receive control information from the second device and the third device;
obtain scheduling information from the control information; and
receive power from the second device and transmit power to the third device while moving based on the scheduling information.

13. The non-transitory computer-readable medium of claim 12, wherein the control information comprises at least one of supply power, demand power, a distance, a power source type, a wireless power type or wireless power frequency information.

* * * * *